US012580376B2

(12) United States Patent
Partridge et al.

(10) Patent No.: US 12,580,376 B2
(45) Date of Patent: Mar. 17, 2026

(54) LOW-PROFILE, AFTER-ALIGNED, UNIVERSAL POINT MOUNT

(71) Applicant: VFC GROUP, LLC, North Salt Lake, UT (US)

(72) Inventors: Kirk Partridge, Park City, UT (US); Todd Vought, Park City, UT (US); Travis Vought, Salt Lake City, UT (US)

(73) Assignee: Lightning Protection Systems, LLC, North Salt Lake, UT (US)

( * ) Notice: Subject to any disclaimer, the term of this patent is extended or adjusted under 35 U.S.C. 154(b) by 68 days.

(21) Appl. No.: 18/128,889

(22) Filed: Mar. 30, 2023

(65) Prior Publication Data

US 2023/0327419 A1 Oct. 12, 2023

Related U.S. Application Data

(60) Division of application No. 17/061,162, filed on Oct. 1, 2020, now Pat. No. 11,637,418, which is a division
(Continued)

(51) Int. Cl.
*H02G 13/00* (2006.01)
*F16B 2/24* (2006.01)
(Continued)

(52) U.S. Cl.
CPC .............. *H02G 13/40* (2013.01); *F16B 2/245* (2013.01); *F16B 11/006* (2013.01);
(Continued)

(58) Field of Classification Search
CPC .......... H02G 13/40; H02G 3/32; H02G 13/00; Y10T 29/49117; Y10T 29/49826;
(Continued)

(56) References Cited

U.S. PATENT DOCUMENTS

| 1,381,236 A | 6/1921 | Pleister |
| 1,876,514 A | 9/1932 | Brach |

(Continued)

OTHER PUBLICATIONS http://www.uline.com/Grp_240/3M-VHB-Tapes?pricode=WI849 &AdKeyword=3m%20vhb%20tape&AdMatchtype=e&gclid= COvctNuh58QCFViUfgodHY8APA&gclsrc=aw.ds, Apr. 7, 2015.
(Continued)

*Primary Examiner* — Timothy J Thompson
*Assistant Examiner* — Michael F McAllister
(74) *Attorney, Agent, or Firm* — Pate, Nelson & Hill, PLLC

(57) ABSTRACT

An anchor for lightning protection systems includes a base and pad that extend over a sufficient area and a sufficient bearing length to hold in shear and in tension against the weight, shear force, and moment of cables, points, and other components of a lightning protection systems. A universal point mount may be forged to optimize cross sectional area and contact surface area throughout the mounting system. Drilled and tapped to receive a point oriented arbitrarily, the head mounts easily on a horizontal or vertical mounting surface. Apertures and fasteners provide arbitrary positioning of a point at any necessary orientation.

20 Claims, 31 Drawing Sheets

Related U.S. Application Data of application No. 16/162,826, filed on Oct. 17, 2018, now Pat. No. 10,797,478, which is a division of application No. 15/008,152, filed on Jan. 27, 2016, now Pat. No. 10,135,233, which is a continuation-in-part of application No. 14/448,684, filed on Jul. 31, 2014, now Pat. No. 9,263,864, which is a continuation-in-part of application No. 13/676,292, filed on Nov. 14, 2012, now Pat. No. 8,950,055.

(51) Int. Cl.

| | |
|---|---|
| *F16B 11/00* | (2006.01) |
| *F16B 37/04* | (2006.01) |
| *F16B 47/00* | (2006.01) |
| *H02G 3/32* | (2006.01) |
| *F16B 5/06* | (2006.01) |

(52) U.S. Cl.
CPC .......... *F16B 37/047* (2013.01); *F16B 47/003* (2013.01); *H02G 3/32* (2013.01); *H02G 13/00* (2013.01); *F16B 5/0685* (2013.01); *Y10T 29/49117* (2015.01); *Y10T 29/49826* (2015.01); *Y10T 29/49869* (2015.01); *Y10T 29/49947* (2015.01); *Y10T 29/49966* (2015.01)

(58) Field of Classification Search
CPC ......... Y10T 29/49869; Y10T 29/49947; Y10T 29/49966; F16B 2/245; F16B 5/0685; F16B 11/006; F16B 37/047; F16B 47/003
USPC .......................................................... 174/3
See application file for complete search history.

(56) References Cited

U.S. PATENT DOCUMENTS

| | | | |
|---|---|---|---|
| 2,166,916 | A | 7/1939 | Lombard |
| 2,783,447 | A | 2/1957 | Watts |
| 3,230,817 | A | 1/1966 | Thomas |
| D244,197 | S | 5/1977 | Ostroll |
| D251,779 | S | 5/1979 | Wolff et al. |
| D262,617 | S | 1/1982 | Shumate |
| D268,316 | S | 3/1983 | Shamoon |
| D285,192 | S | 8/1986 | Hubbard et al. |
| D285,246 | S | 8/1986 | Fetty |
| D294,676 | S | 3/1988 | Egner et al. |
| D295,258 | S | 4/1988 | Niwa |
| D295,368 | S | 4/1988 | Niwa |
| D302,655 | S | 8/1989 | Sachs |
| D315,668 | S | 3/1991 | Murphy |
| 5,050,836 | A | 9/1991 | Makous |
| 5,070,805 | A | 12/1991 | Plante |
| D331,358 | S | 12/1992 | Sachs |
| D334,332 | S | 3/1993 | Massey |
| D342,013 | S | 12/1993 | Sachs |
| D349,038 | S | 7/1994 | Sachs |
| D356,729 | S | 3/1995 | Kassouni |
| 5,407,310 | A | 4/1995 | Kassouni |
| 5,518,440 | A | 5/1996 | Bone |
| D371,293 | S | 7/1996 | Schoenmeyr |
| D376,713 | S | 12/1996 | Kelso |
| D376,972 | S | 12/1996 | Zissu |
| 5,581,900 | A | 12/1996 | Payne |
| D382,920 | S | 8/1997 | Munir |
| D390,099 | S | 2/1998 | Bailey |
| 5,796,032 | A | 8/1998 | Hadley |
| 5,799,404 | A | 9/1998 | Payne |
| 5,819,425 | A | 10/1998 | Payne |
| D407,012 | S | 3/1999 | Williams |
| D426,146 | S | 6/2000 | Bruns et al. |
| D431,176 | S | 9/2000 | Zarnoti |
| 6,369,317 | B1 | 4/2002 | Rapp |
| D470,039 | S | 2/2003 | Pelc |
| D471,400 | S | 3/2003 | Jeter et al. |
| D604,534 | S | 11/2009 | Guggenbiller, Jr. |
| D618,992 | S | 7/2010 | Rix |
| D623,868 | S | 9/2010 | Schiestl |
| D636,656 | S | 4/2011 | Schaefer et al. |
| 8,050,007 | B1 * | 11/2011 | DeGurski .............. H02G 13/00 |
| | | | 361/216 |
| D662,805 | S | 7/2012 | Macdonald et al. |
| D663,612 | S | 7/2012 | Pelc |
| D678,039 | S | 3/2013 | Psaila |
| D679,172 | S | 4/2013 | Dixon |
| D716,636 | S | 11/2014 | McDonald |
| 8,950,055 | B2 | 2/2015 | Partridge et al. |
| D726,365 | S | 4/2015 | Weigensberg |
| D729,572 | S | 5/2015 | Moran |
| D734,133 | S | 7/2015 | Spindler |
| D737,120 | S | 8/2015 | Recker et al. |
| 9,096,284 | B2 | 8/2015 | Meulemans |
| 9,178,343 | B2 | 11/2015 | Brouwer et al. |
| D745,369 | S | 12/2015 | Tungesvick |
| 9,263,864 | B2 | 2/2016 | Partridge et al. |
| D758,830 | S | 6/2016 | Partridge et al. |
| D762,455 | S | 8/2016 | Partridge et al. |
| D764,896 | S | 8/2016 | Partridge et al. |
| D764,897 | S | 8/2016 | Partridge et al. |
| 9,590,398 | B2 | 3/2017 | Partridge et al. |
| D814,277 | S | 4/2018 | Partridge et al. |
| 10,135,233 | B2 | 11/2018 | Partridge et al. |
| 10,250,025 | B2 | 4/2019 | Partridge et al. |
| 10,797,478 | B2 | 10/2020 | Partridge et al. |
| 2002/0157842 | A1 | 10/2002 | Rapp |
| 2005/0183261 | A1 | 8/2005 | Nebesnak et al. |
| 2011/0142644 | A1 * | 6/2011 | Fritz .................... F03D 1/0675 |
| | | | 416/146 R |
| 2011/0253579 | A1 | 10/2011 | Chong |
| 2011/0286785 | A1 | 11/2011 | Brouwer et al. |
| 2012/0301300 | A1 | 11/2012 | Muto |
| 2015/0282612 | A1 | 10/2015 | Rutz |
| 2016/0268793 | A1 | 9/2016 | Partridge et al. |
| 2019/0029514 | A1 | 1/2019 | Tsukada et al. |

OTHER PUBLICATIONS http://www.youtube.com/watch?v=U2vbR34jBzk&feature=related 3M VHB adhesive demonstration holds up man—Another Geek Moment, Screenshot, Apr. 7, 2015.
http://www.youtube.com/watch?v=hNgtol3IsQ4 30 Years of 3M™ VHB™ Tape, Screenshot, Apr. 7, 2015.
http://www.lightningrodsupply.com/index_files/page0001.htm Lightning Rod Parts Equipment, pp. 1-5, Apr. 7, 2015.
http://www.erico.com/products/LP302.asp ERICOR® ERITECH® Universal Air Terminal Base LP302 pp. 1-2, Apr. 7, 2015.
http://www.enrico.com/products/SR000E.asp ERICO® ERITECH® System 2000 Lightning Protection System-America pp. 1-2, Apr. 7, 2015.
http://www.kuefler-lightning.com/series800-fasteners.htm?gclid=CKfk_vSk5cQCFY-Tfgod Lightning Protection Copper, Aluminum Cable Straps, Holders for Standing Seam Roofing Series 800-Lightning Protection Conductor Fasteners pp. 1-5, Apr. 7, 2015.

* cited by examiner

LOW-PROFILE, AFTER-ALIGNED, UNIVERSAL POINT MOUNT

1. RELATED APPLICATIONS

This application: is a divisional of U.S. patent application Ser. No. 17/061,162, filed Oct. 1, 2020; which is a divisional of U.S. patent application Ser. No. 16/162,826, filed Jan. 17, 2018; which is a divisional of U.S. patent application Ser. No. 15/008,152, filed Jan. 27, 2018; which is a continuation in part of U.S. patent application Ser. No. 14/448,684, filed Jul. 31, 2015, issued Feb. 16, 2016, as U.S. Pat. No. 9,263,864; which is a continuation in part of U.S. patent application Ser. No. 13/676,292, filed on Nov. 14, 2012, issued Feb. 10, 2015, as U.S. Pat. No. 8,950,055; all of which are incorporated herein by reference in their entirety.

2. FIELD OF THE INVENTION

This invention relates to lightning protection systems and, more particularly, to novel systems and methods for mounting and anchoring cables and points thereof.

3. BACKGROUND ART

Lightning arresters are central to power systems. Typical power delivery and transmission systems involve towers or power poles holding long expanses of power-carrying cables high above the surface of the earth and across large tract of land. The power delivery systems of the public utilities create a grid across the country connecting cities, power plants, substations, generators, dams, and so forth.

Surge arresters or lightning arresters are responsible for drawing the current from lightning into conductors that will conduct the energy to ground. Accordingly, they may involve wires and air terminals above the level of the power carrier cables. Meanwhile, addition surge protection may be provided to assure that no breakdown occurs in the insulators that insulate the main power carrier lines from their towers or poles that suspend them above the earth.

Buildings have a similar problem. They stand above the earth and tend to draw lightning. Thus, lightning rods date from very early days in America. Basic lightning rod systems of yesteryear involved an air terminal or "point" that was typically fastened to extend above the highest point of a building. This air terminal or point was connected to a cable that conducted electricity from the point down to ground, literally the surface of the earth.

With modern architecture and modern buildings, the problem has become more complex in that multiple air terminals or points may be attached to a building, and a building may not have a single highest location. Often, with false fronts, parapets, and other architectural features, a rather large expanse of a building architecture may be located at the "highest" location.

Lightning protection for buildings has progressed according to certain standards. Typically, cables of a suitable size will be connected, anchored at approximately every three feet along their length, and run from point to point, where a "point" indicates an air terminal or a lightning "point" as that term is used in the art. Typically, all the points on a building will be connected to one another and to a grounding cable that carries any electrical power received from the points down to the ground.

Nevertheless, interfacing hardware with a building presents a design question. For example, buildings may be constructed of wood, masonry, concrete, steel, glass, combinations and so forth. The range of materials and their material properties vary widely. Similarly, lightning protection is not the only consideration in designing a building.

Meanwhile, lightning protection may often be provided retroactively. Buildings may already exist, and lightning protection may not have been designed into them. By the same token, even when lightning protection is contemplated during the architectural phase of a building, the attachment scheme of a lightning protection system is a consideration that must be dealt with in view of the other architectural features of the building.

At present, electrical fasteners are connected by any suitable means, which usually involves fastening to a structural portion of the building. Thus, protective covers, plates, caps, sheeting, flashing, or other mechanisms for protecting the upper reaches of a building from weather may be damaged, penetrated, breached, or otherwise compromised by the fasteners of a lightning protection system. What is needed is a less invasive lightning protection system.

Specific improvements that may be useful include a universal mounting system for lightning or arrester points. The point or rod that literally draws a lightning strike to a protection system, rather than to the protected structure, may need to be oriented on a horizontal surface, a vertical surface, or some other location. Accordingly, it would be an advance in the art to provide a universal mounting system that will mount to a suitable bracket or building mounting system, and yet be capable of being oriented to receive a lightning arrester point in a vertical orientation. Meanwhile, receiving a cable for carrying current from the point and its corresponding mounting hardware should also be accommodated such that orienting the mount to receive the point leaves available a suitable securement location and hardware for receiving and securing the conducting cable.

It has been Applicants' experience that conventional mounting hardware is sometimes destroyed by a lightning strike because the connections are insufficiently robust, the contact area is insufficiently extensive, and the cross sectional area of mounting hardware is too small for proper current conduction of the current from a lightning strike. More cross sectional area, greater contact area, and greater mass would be beneficial in the entire contact path from a point to the conducting cable of a lightning protection system.

BRIEF SUMMARY OF THE INVENTION

In view of the foregoing, in accordance with the invention as embodied and broadly described herein, a method and apparatus are disclosed in one embodiment of the present invention as including an anchor suitable for supporting the weight of a cable, a point, or other accessories associated with a lightning arrester system. In certain embodiments, an anchor in accordance with the invention may include a base or plate from which a stud extends. In this embodiment, the base or plate and the stud together form a mounting system to which to secure a bracket or other device designed to secure a cable, point, or the like.

For example, an adhesive pad or interface pad may be secured to the flat, back side of the plate, opposite the stud on the other side. The pad may provide differential strain and stress between a portion of the building or a location of the building where the anchor is mounted, and the material of the base.

Likewise, the material of the pad may be selected to provide shock resistance, sealing, flexibility, impact resistance, adhesion, and a reconciliation of differing coefficients of thermal expansion between the material of the building and the base of the anchor secured thereto.

In some embodiments, the stud may be threaded to receive a nut or other keeper. Similarly, ratchets, binding slides, keys, pins, and other types of fasteners may be used to secure brackets to the stud in order to anchor points, cables, or both to the anchor, which in turn secures them to the building.

In certain embodiments, a building may include a parapet, wall, or other architectural feature that acts as the extremum the maximum distance away from the ground. Accordingly, this parapet or wall may have a flashing, cap, protection, seal, coating, or the like protecting it from the elements. Accordingly, the pad may be provided with a structural adhesive that secures the pad to the flashing, seal, cover, cap, or the like of the building. Thus, the anchor need not penetrate the protection provided against weather on the building. In certain embodiments, the stud may hold a bracket of any suitable type that will secure a point, a standoff, a bracket, a clip, or other holder suitable for holding a component of the lightning protection system.

In yet another embodiment, an integrated or universal anchor may be formed from sheet metal to have arms that extend away from the base or plate a certain distance, cantilevering with respect thereto and deflecting in a response to force. The arms may extend and be bent or otherwise formed into guides, which may terminate in retainers. In certain embodiments, the cables may be pushed against the guides, which act as springs and also push against the arms, such that the guides and arms together deflect away from the cable, thus opening a gap suitable for receiving the cable against the base. In response to the cable snapping in past the guides, the arms and guides may return to their unstressed positions, capturing the cable by a retainer connected thereto. Thus, the cable may be held permanently, in a very simple system that snaps the cable into place.

In one embodiment of a process in accordance with the invention, a user may select parameters controlling the performance of an anchor, and select properties of materials and structures. Securements may be selected, after which materials meeting the parameters, properties, and structures may be selected. Stock may be cut and anchors may be assembled, fabricated or otherwise manufactured.

Providing an instruction for installation procedures and operating procedures with a packaging for the anchors, a manufacturer may distribute the anchors to installers. Installers may then analyze specifications for their installation, select sizes, materials, and processes suitable and apply the anchors to a building. Thereafter, the cables and points may be installed with other ancillary equipment, secured by the anchors.

For example, in one embodiment one may size the anchors in order to minimize the leverage, moment, or couple (engineering terms, used here as known in the engineering art) to support the weight of cables. The cables need to be supported not only against their own dead weight, but also against the weight of pulling or tensioning to which installers will subject the cables in order to minimize the sag in the cables.

Selecting a pad material may be done at the time of manufacture of an anchor, or may be done at a different time. Typically, pads will be sized, cut, and applied to anchors in a manufacturing situation. The pads will then be applied to a building as part of the anchor. An installer may remove a protective coating, such as a polymer film attached to an adhesive layer of the pad or on the pad in order to expose the pad for use. An installer may select a location on a building, and may need to clean that location.

For example, dust, debris, oxidized base material, and the like may interfere with adhesion. Therefore, a location on a building may be cleaned by solvents, scrubbing, wiping, or the like. Removing any protective layer will expose the pad such that the anchor can then be applied.

Applying a cure condition may be required for one of several reasons. For example, polymers may need time, heat, ultraviolet light, or other chemical effects in order to cure. In certain embodiments, where materials are adhesives that do not rely on the chemistry of their base material or of the location to which attached, materials may simply need time in order to fully flow, creep, or otherwise secure to an anchoring location. By whatever means required, application of a cure condition may be followed by positioning cables, including tensioning them in order to reduce sag. Thereafter, the cables may be bound to the anchors by brackets, whether integrated, bolted on, or the like.

Such a system provides many benefits. The load is distributed over a much larger area by anchors in accordance with the invention. The actual cross sectional area of material from the cover or wall protection to which an anchor may be secured is substantially larger than that of a threaded-in fastener, which penetrates and engages a small fraction of a square inch of area of building material. Moreover, there is no penetrating whatsoever of the seal, cap, flashing, or other protection materials and structures of the building. Thus, capillary action is absent to damage the building covered by the protection of the cap, seal, or the like.

Moreover, there is no caulking step to put a washer, caulk, putty, or the like around the area where a penetration has been put through a protective layer, into a wall, or both. Rather, the pad may form a seal to survive many freeze and thaw cycles. It may be selected of a material that will not harden with time, temperature extremes, or the like.

Likewise, there will be no need to set up a system of anchors limited to proceeding along horizontal surfaces at the top of a building. There need be no waiting for a period of days before they will sufficiently cure to hold. If some systems are used on vertical surfaces, they must be maintained above a minimum temperature, typically around fifty degrees Fahrenheit, and maintained for several days, typically two to three, before they are sufficiently cured to hold. Even then, they may have wide spread failures.

In accordance with the invention, non-penetrating, comparatively rapidly mounted, supports may be installed as anchors on vertical surfaces.

In one specific embodiment of an apparatus and method in accordance with the invention, a head is configured to mount with a corresponding bracket or mandible to be secured on a non-penetrating base plate. The base plate, having a square shape, and having four studs projecting from the four corners thereof, may receive a cleat plate or mandible that is also shaped as a square, and which may be oriented with any corner aperture matched to a particular stud of the base plate. In this way, the cleat plate or mandible may be secured in any of four different orientations to a base plate, and secured thereto on the studs thereof. Meanwhile, two studs oppose 180 degrees from one another project out of the face of the cleat plate or mandible. Likewise, along each side is oriented a rack that is cut partially from the mandible and bent away from the base plate to present the teeth toward the head. Thus, all four sides of the mandible have teeth directed toward the head.

The head then includes slots or relief extending as a cross or x along the backside thereof. The relief sits over the rack of teeth on each side and extends across the full diameter of the head. The relief or slot orients and secures a cable between the head and the teeth. Due to the orientation of the studs of the mandible, and the teeth, a cable may be run in either direction from side to side across the mandible, and any other direction from side to side across the head. Thus, the head may be oriented in either two positions to the mandible, and the mandible may be positioned in any of four positions, two symmetric pair, with respect to the base plate.

Thus, the mandible may be mounted to the base plate and the head may be mounted to the mandible in such a way that the point may be directed vertically regardless of whether the supporting surface for the base plate is horizontal or vertical.

Also, the head is comparatively thick, thus having substantial carrying capacity for electrical current received from the lightning strike. This provides a considerably improved connection from the point to the cable, in which the attachment hardware does not create a current limiting link. Particularly, the current carrying capacity of the head is sufficiently great that it presents always a greater cross sectional area than the point, the cable, or the mounting hardware for current carrying capacity. Also, the contact area is between the conductor (cable) and the head, as well as between the point and the head. Other attachment hardware is not in the direct path of conducting a strike. Those attachment devices may still see the capacitive currents that flow as free electrical charge fills all conductors, but they do not carry the principal current to ground from a strike. The head is also sufficiently heavy to minimize temperature rise, dissipate resistive heating, and maintain structural integrity without melting. Arcs are possible but are preferentially directed by geometry to remain inside the envelope of the contact regions between the cable strands and the head, and between the threads of the point and matching threads of the head.

6

Figure 1:
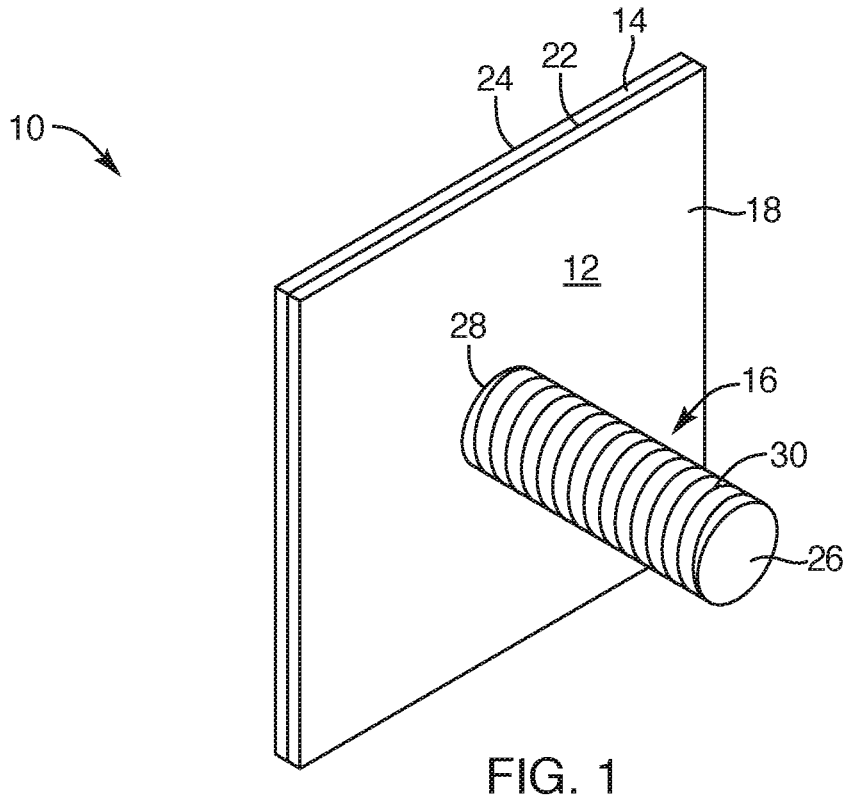
FIG. 1 is a perspective view of one embodiment of a non-penetrating anchor for a lightning arrester cable support in accordance with events.
Figure 2:
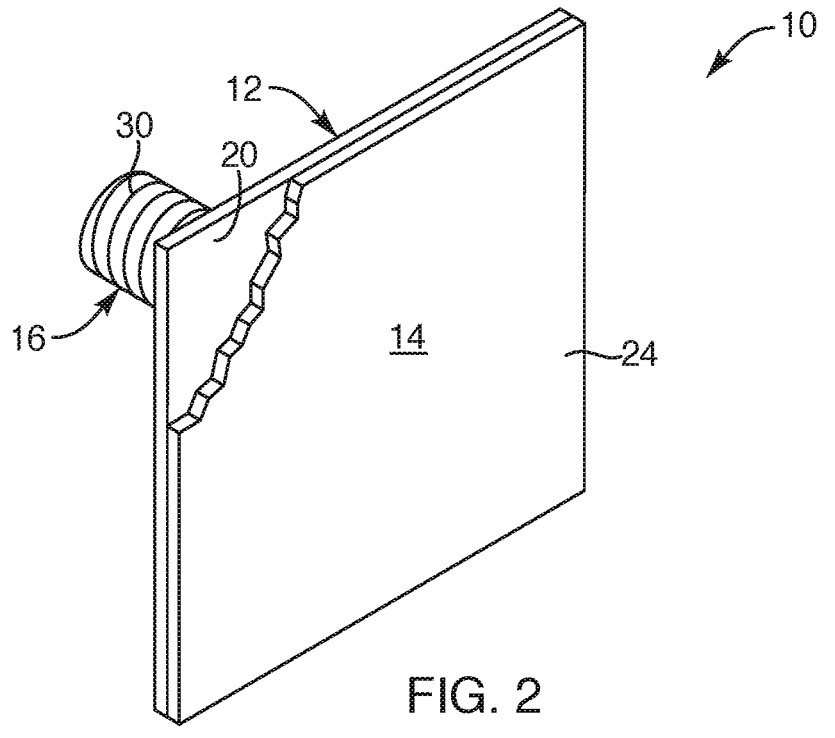
FIG. 2 is a rear perspective view of the anchor of FIG. 1.
Figure 3:
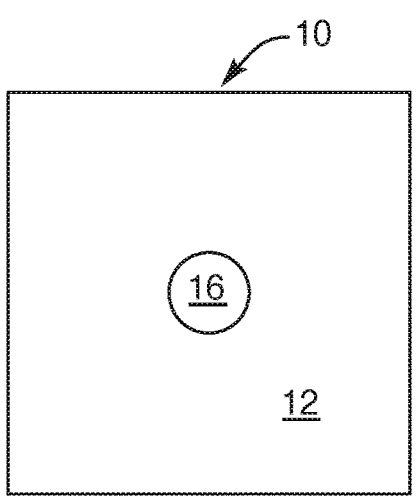
FIG. 3 is a front elevation view of the apparatus of FIG. 1.
Figure 4:
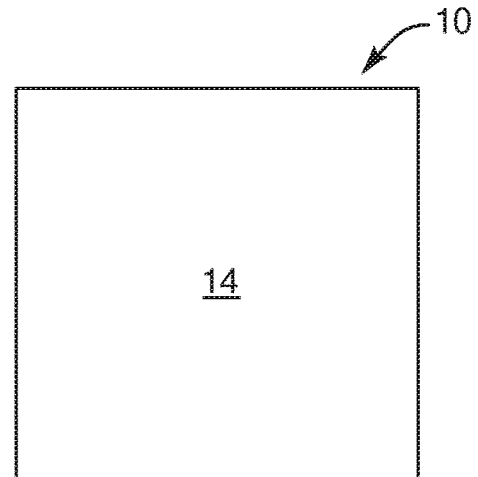
FIG. 4 is a rear elevation view thereof.
Figure 5:
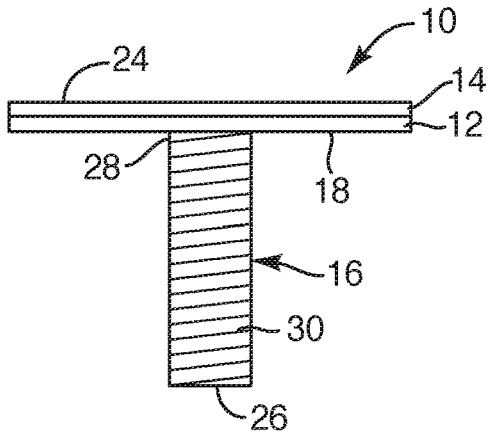
FIG. 5 is a top plan view thereof.
Figure 6:
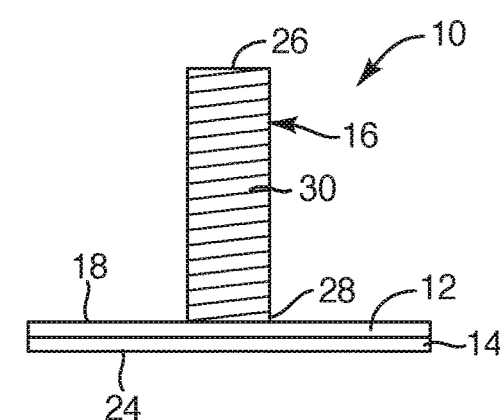
FIG. 6 is a bottom plan view thereof.
Figure 7:
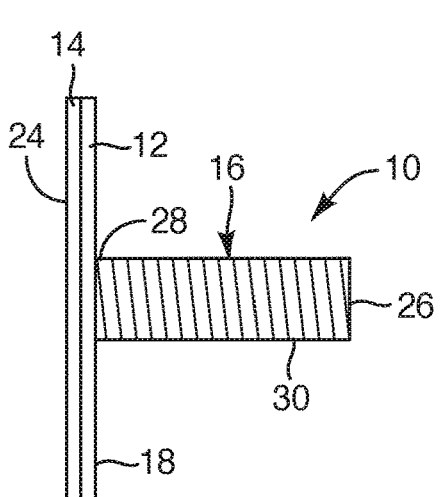
FIG. 7 is a left elevation view thereof.
Figure 8:
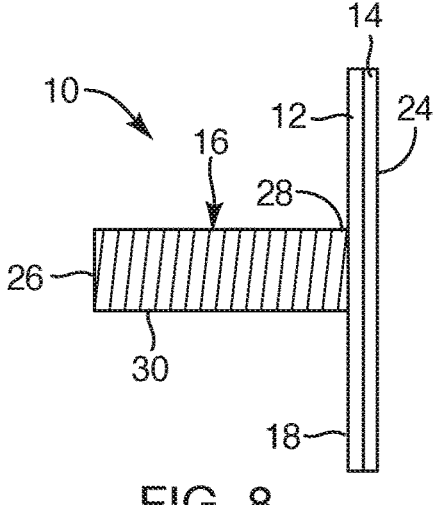
FIG. 8 is a right side elevation view thereof.
Figure 11:
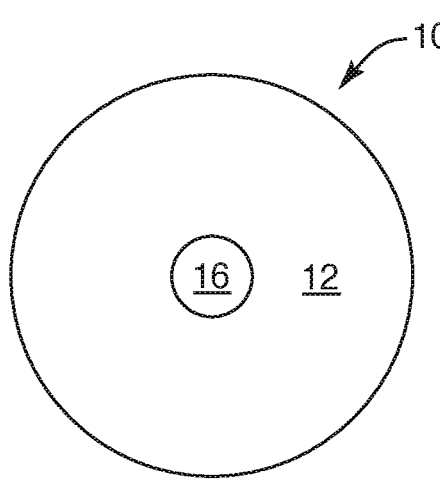
FIG. 11 a front elevation view thereof.
Figure 12:
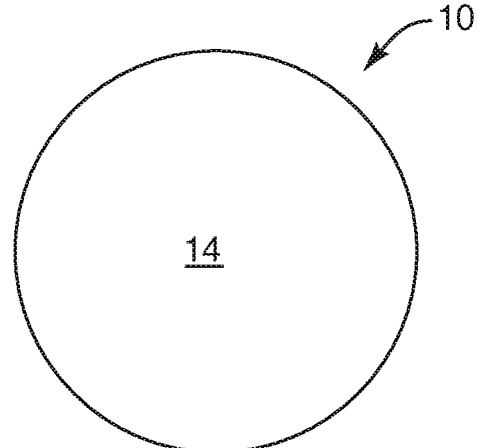
FIG. 12 is a rear elevation view thereof.
Figure 13:
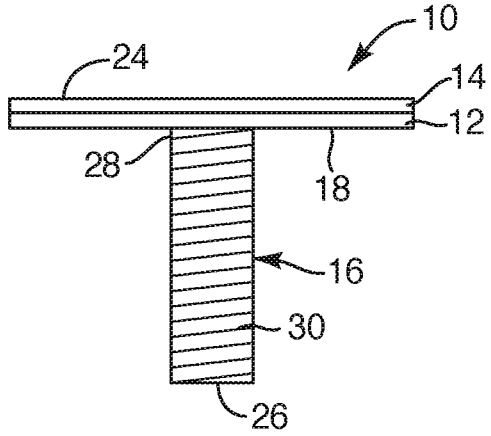
FIG. 13 is a top plan view thereof.
Figure 14:
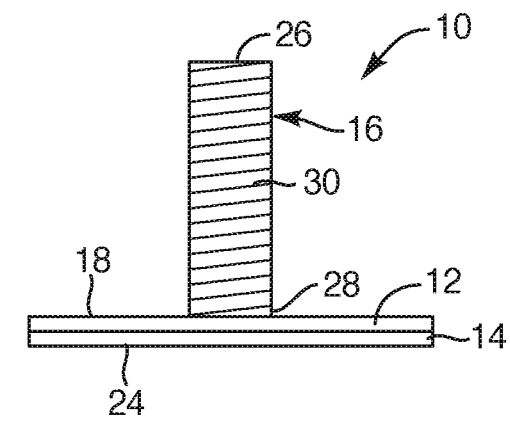
FIG. 14 is a bottom plan view thereof.
Figure 15:
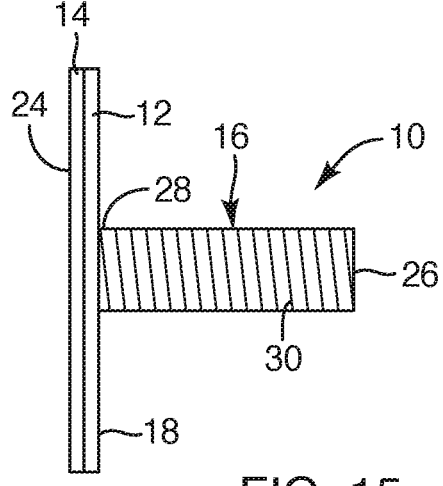
FIG. 15 is a left side elevation view thereof.
Figure 16:
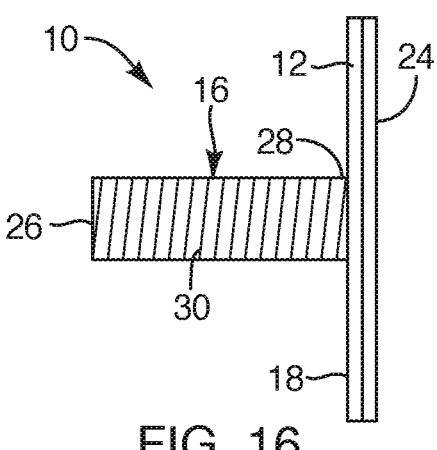
FIG. 16 is a right side elevation view thereof.
Figures 17A, 17B:
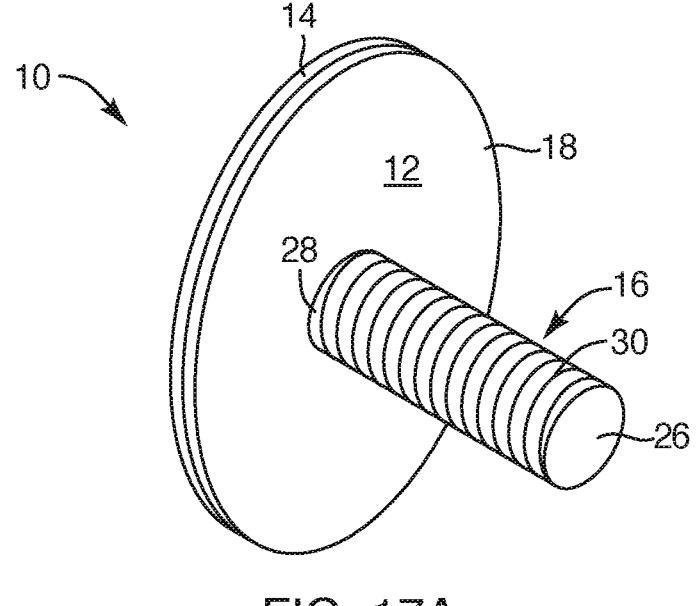
FIG. 17A is a frontal perspective view of an alternative embodiment relying on an oval shape for the base plate of the anchor of FIGS. 1 and 9.
FIG. 17B is a rear perspective view of the anchor of FIG. 17A.
Figure 18A:
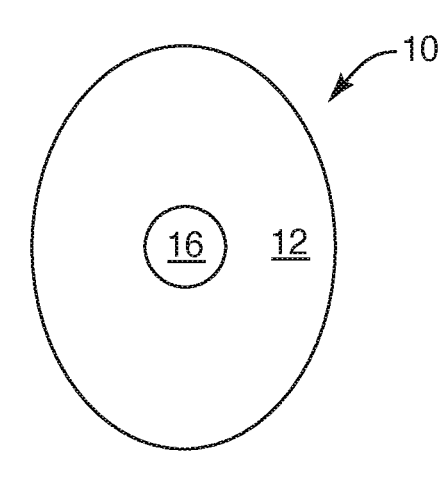
Figure 18B:
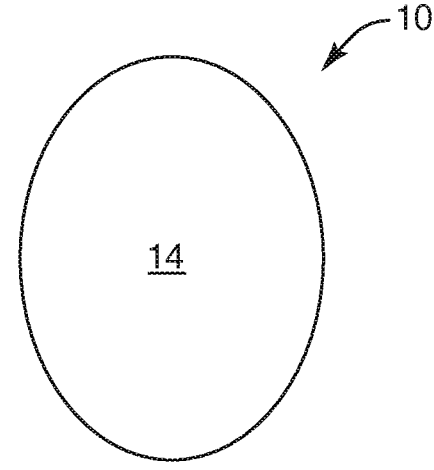
Figure 18C:
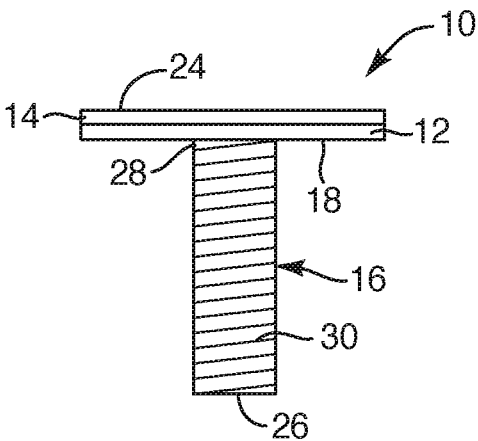
Figure 18D:
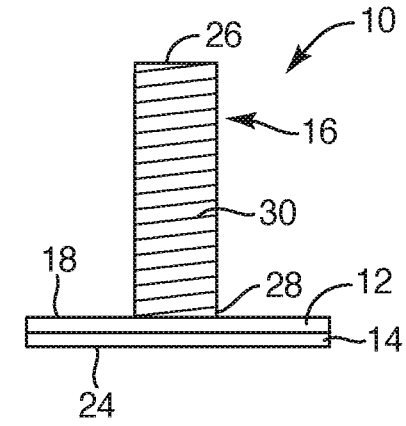
Figure 18E:
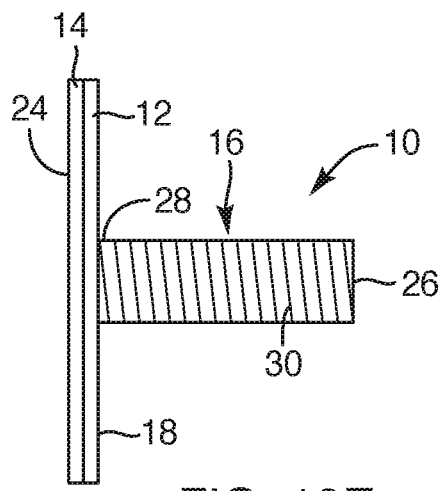
Figure 18F:
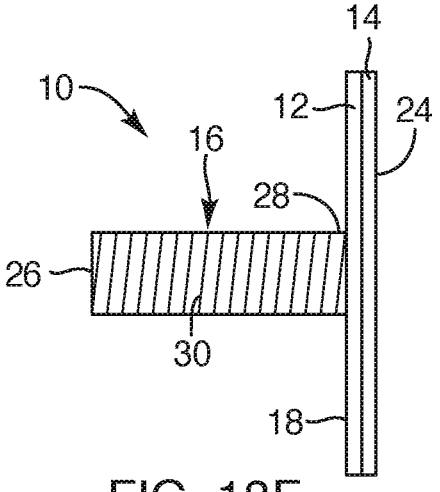
Figure 19A:
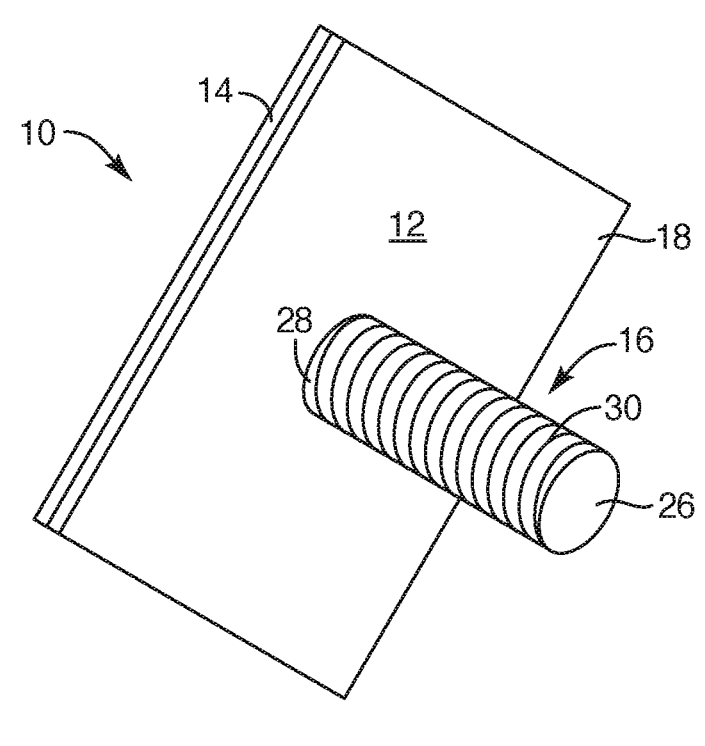
Figure 19B:
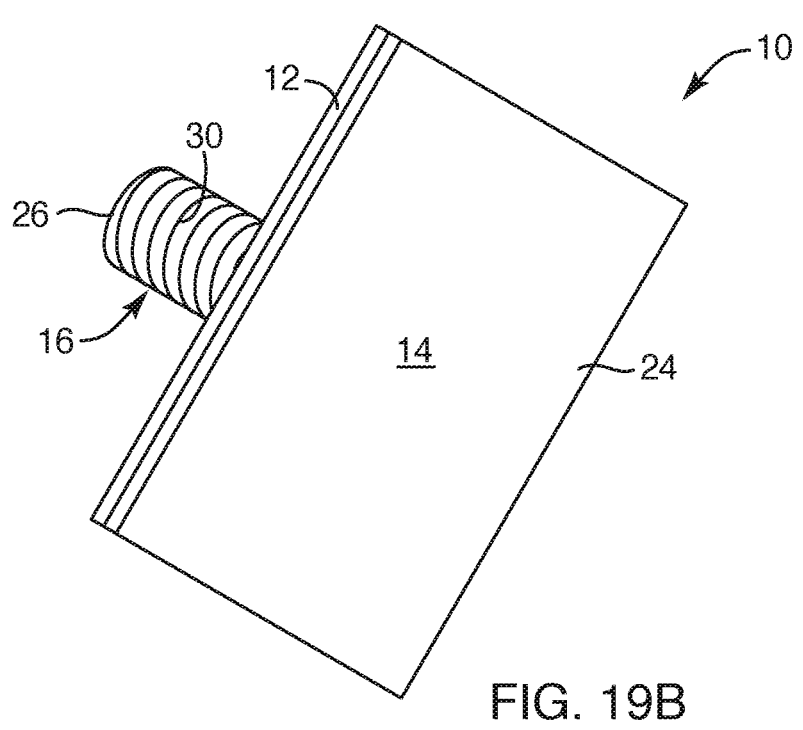
Figures 19C, 19D, 19E, 19F, 19G, 19H:
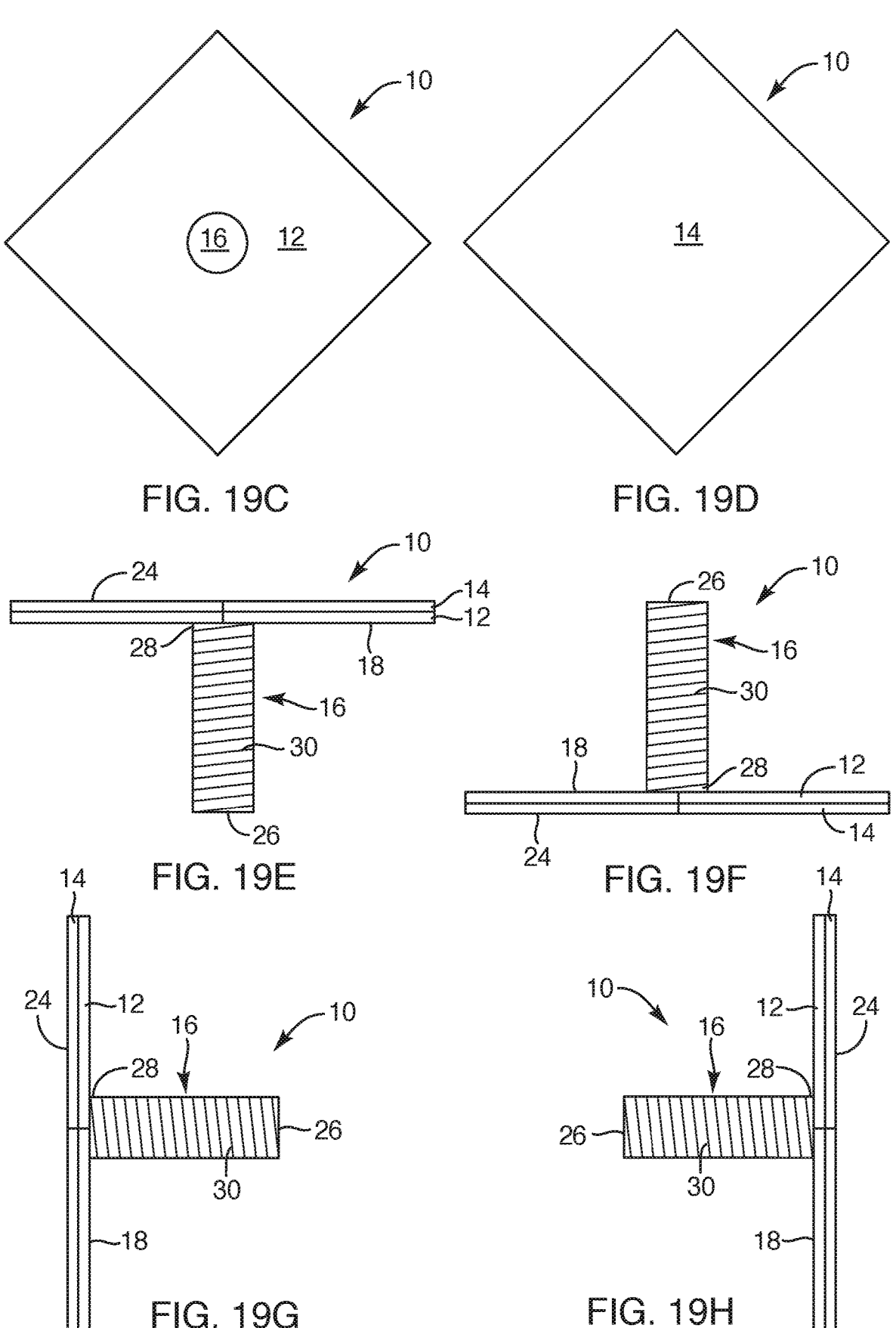
Figure 20:
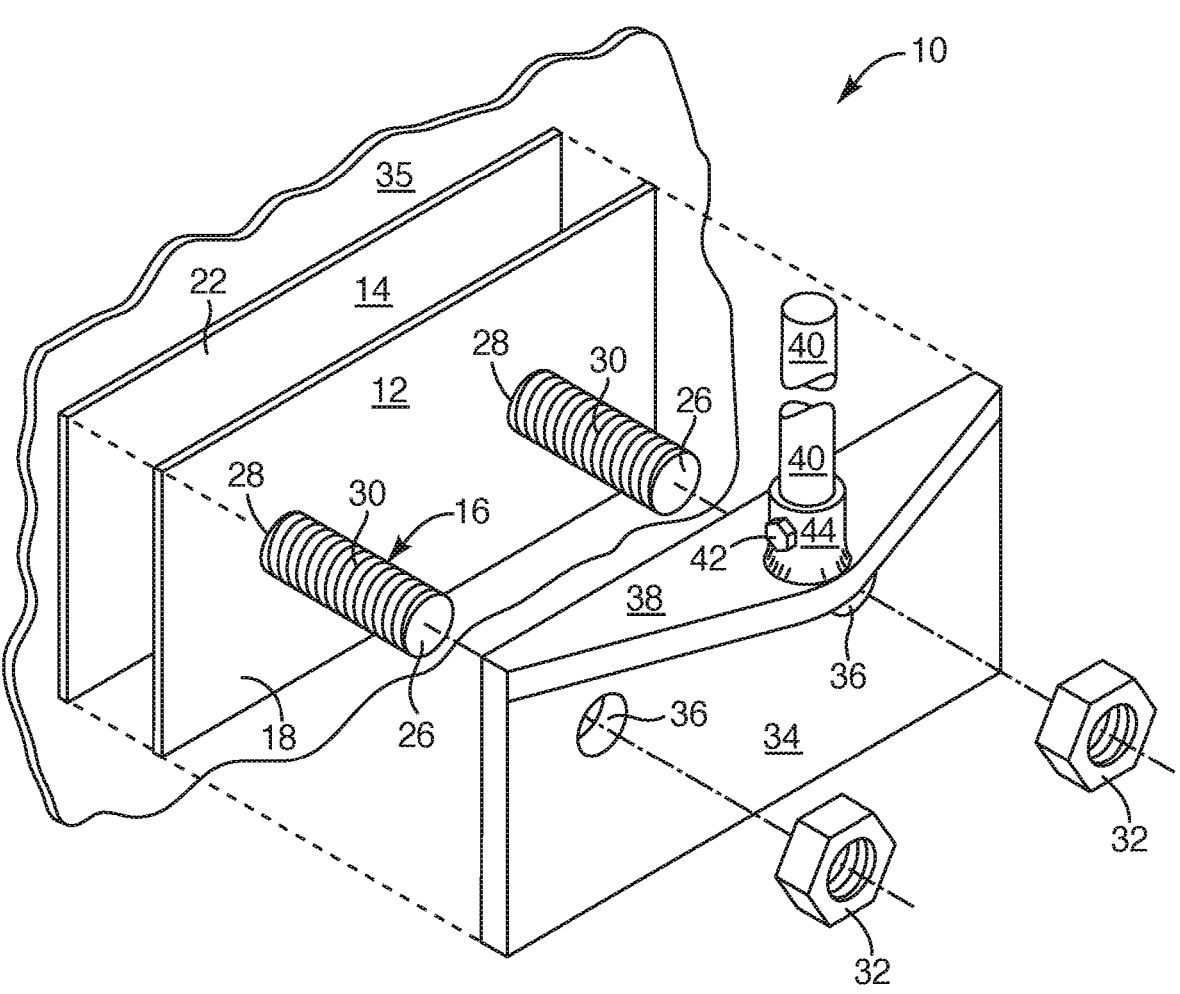
Figure 21:
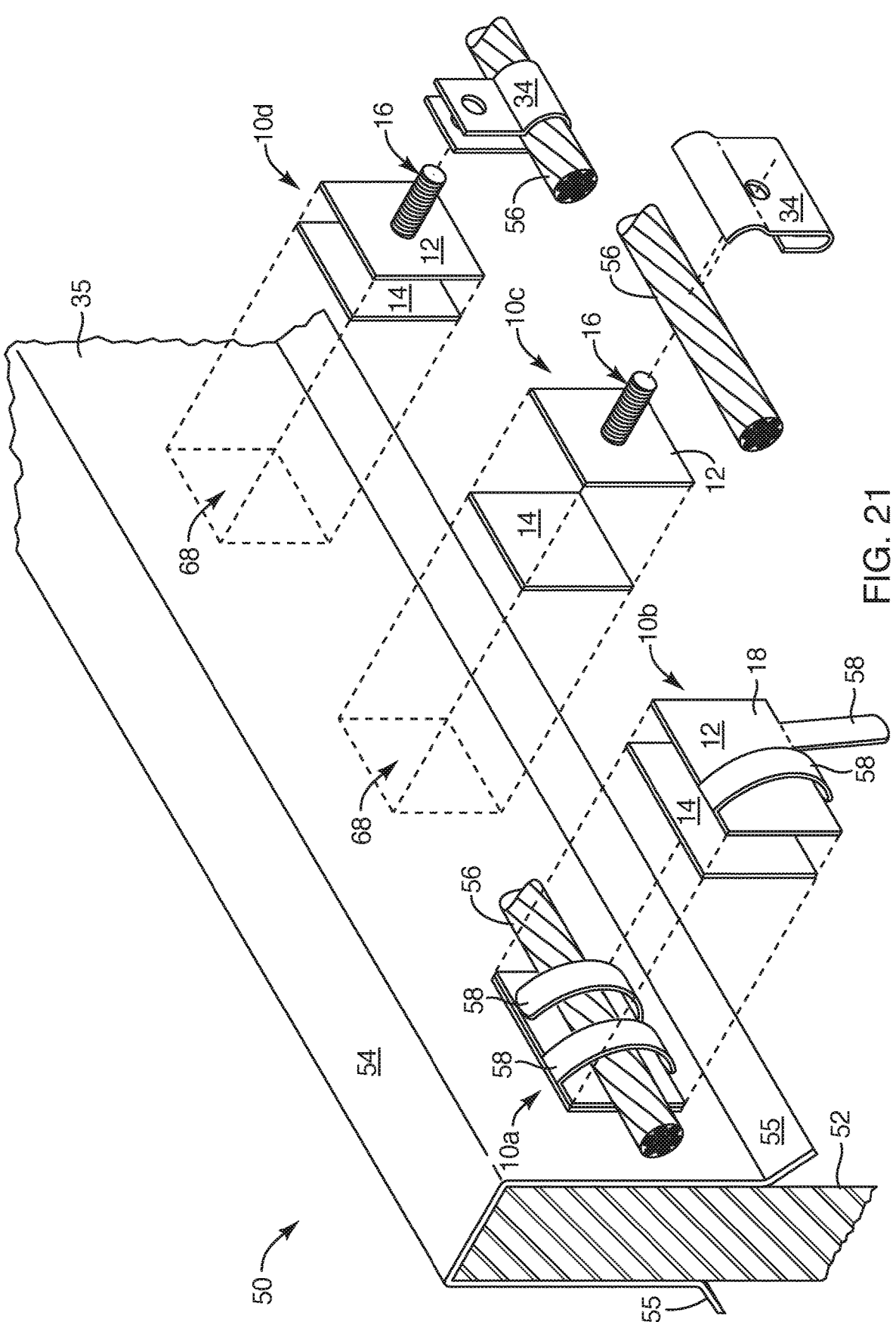
Figure 22:
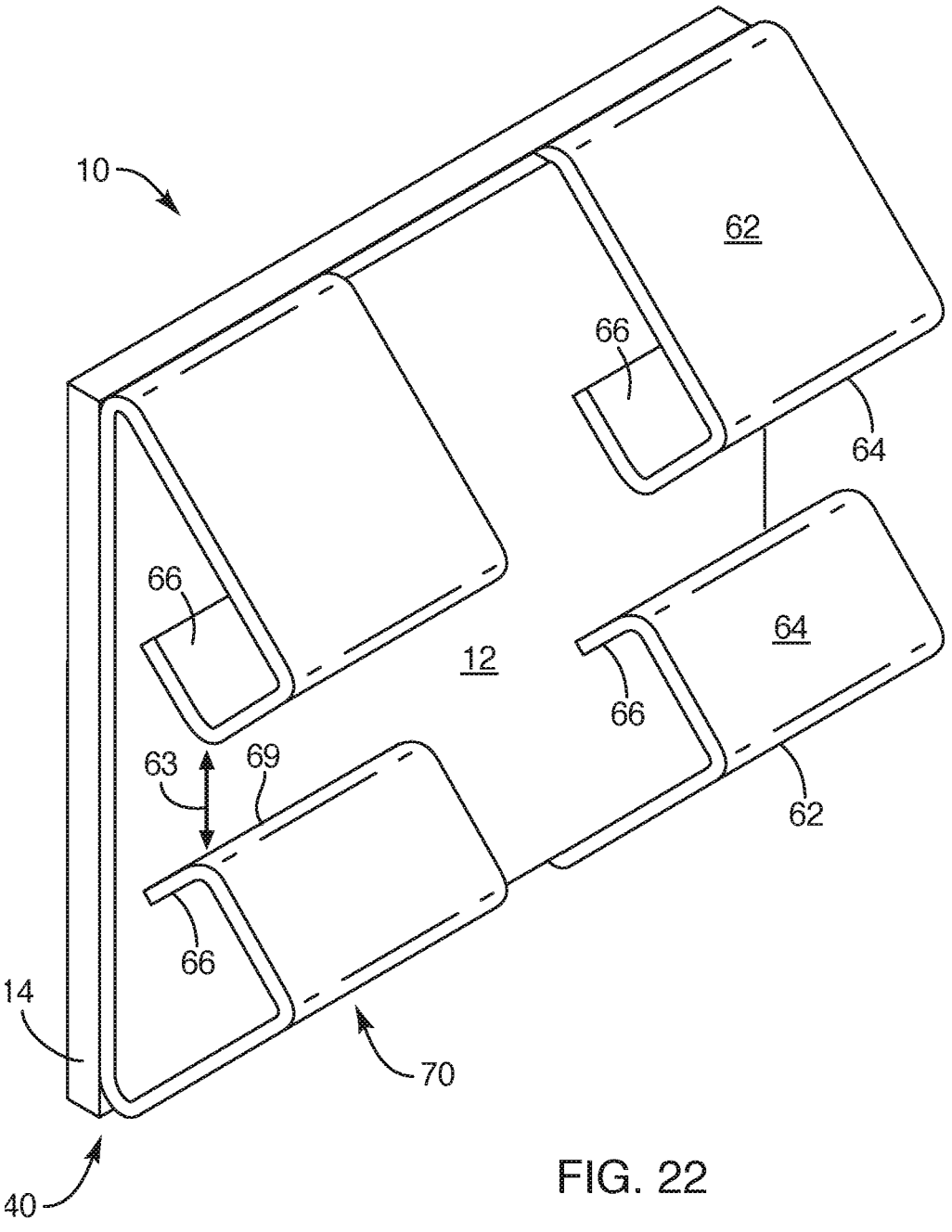
Figure 23A:
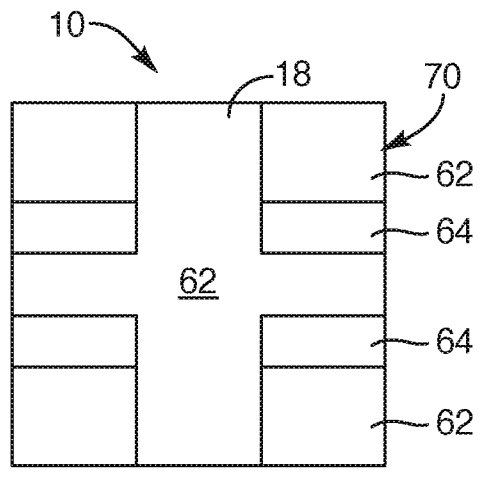
Figure 23B:
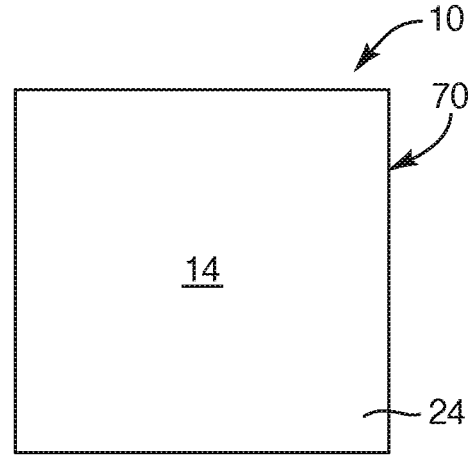
Figure 23C:
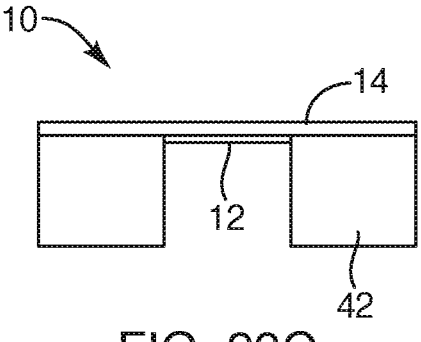
Figure 23D:
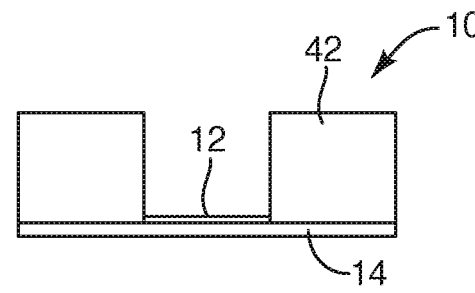
Figure 23E:
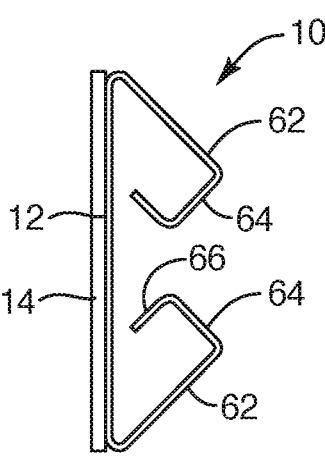
Figure 23F:
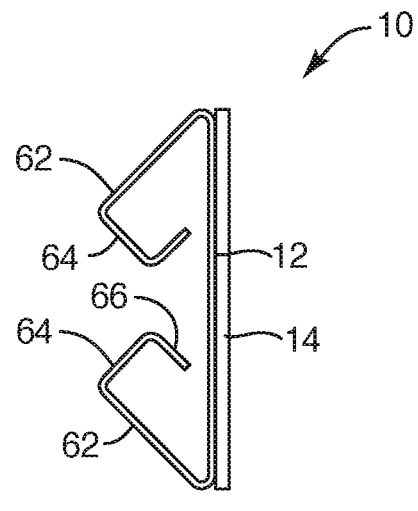
Figure 24:
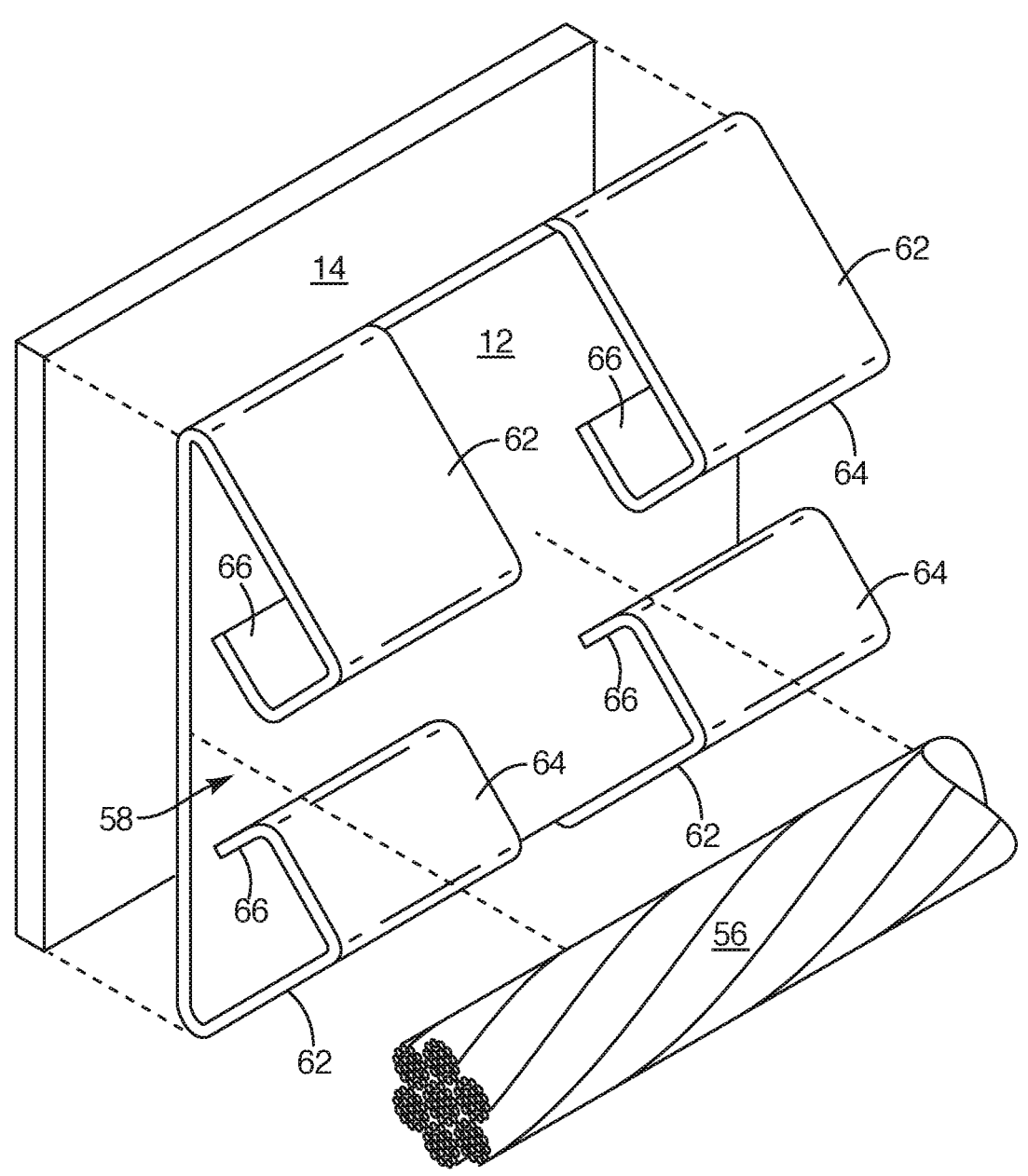
Figure 25:
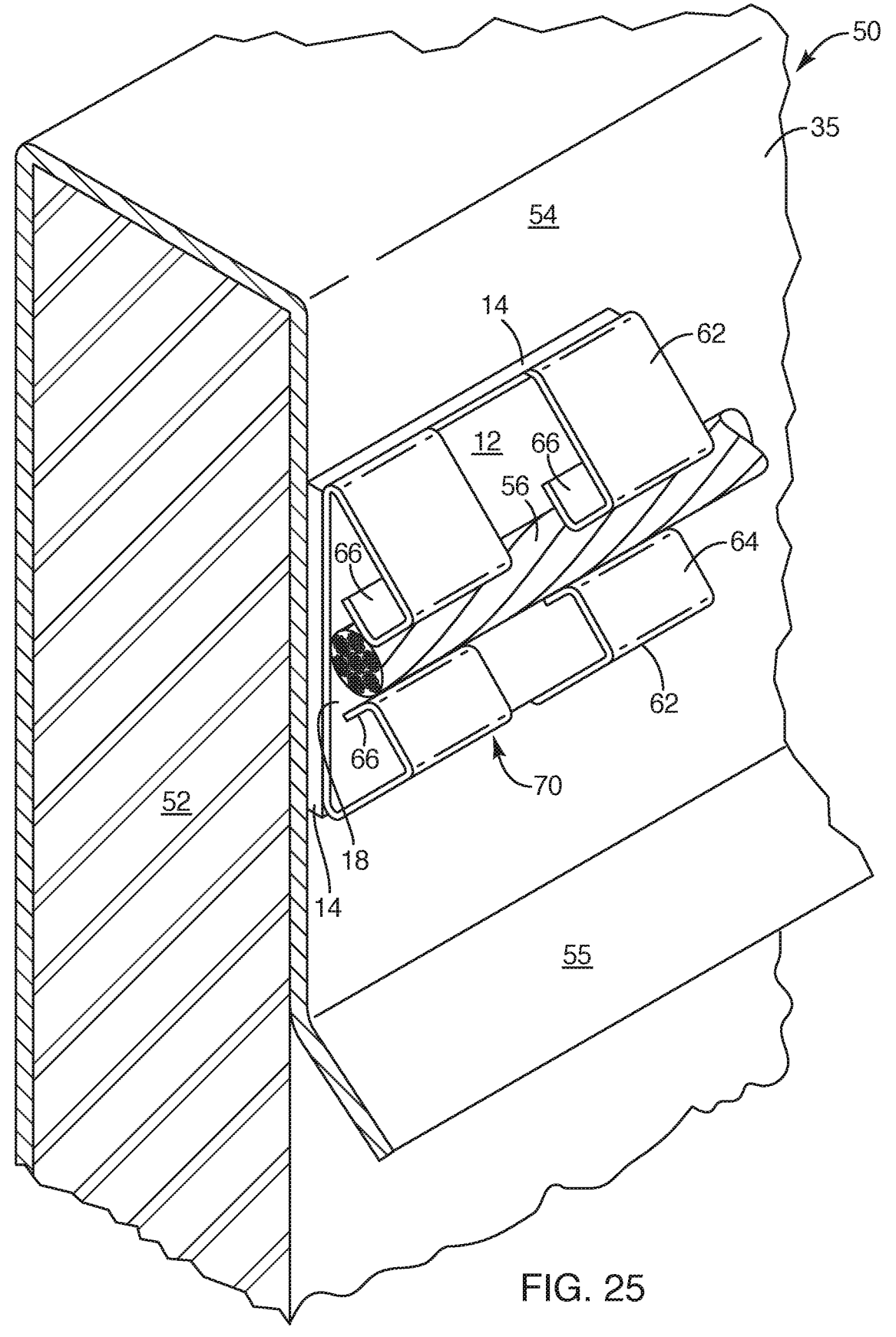
Figure 26A:
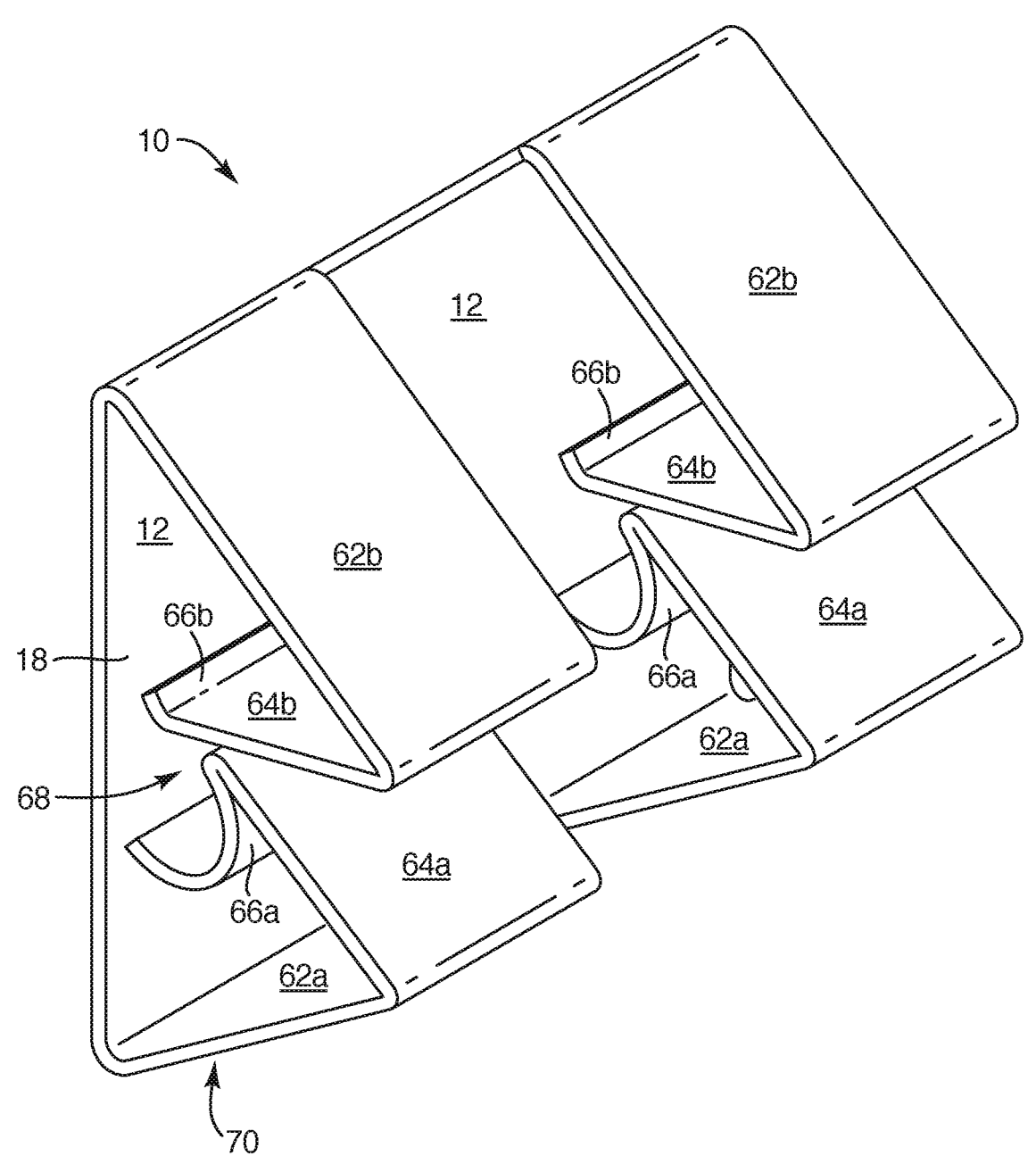
Figure 26B:
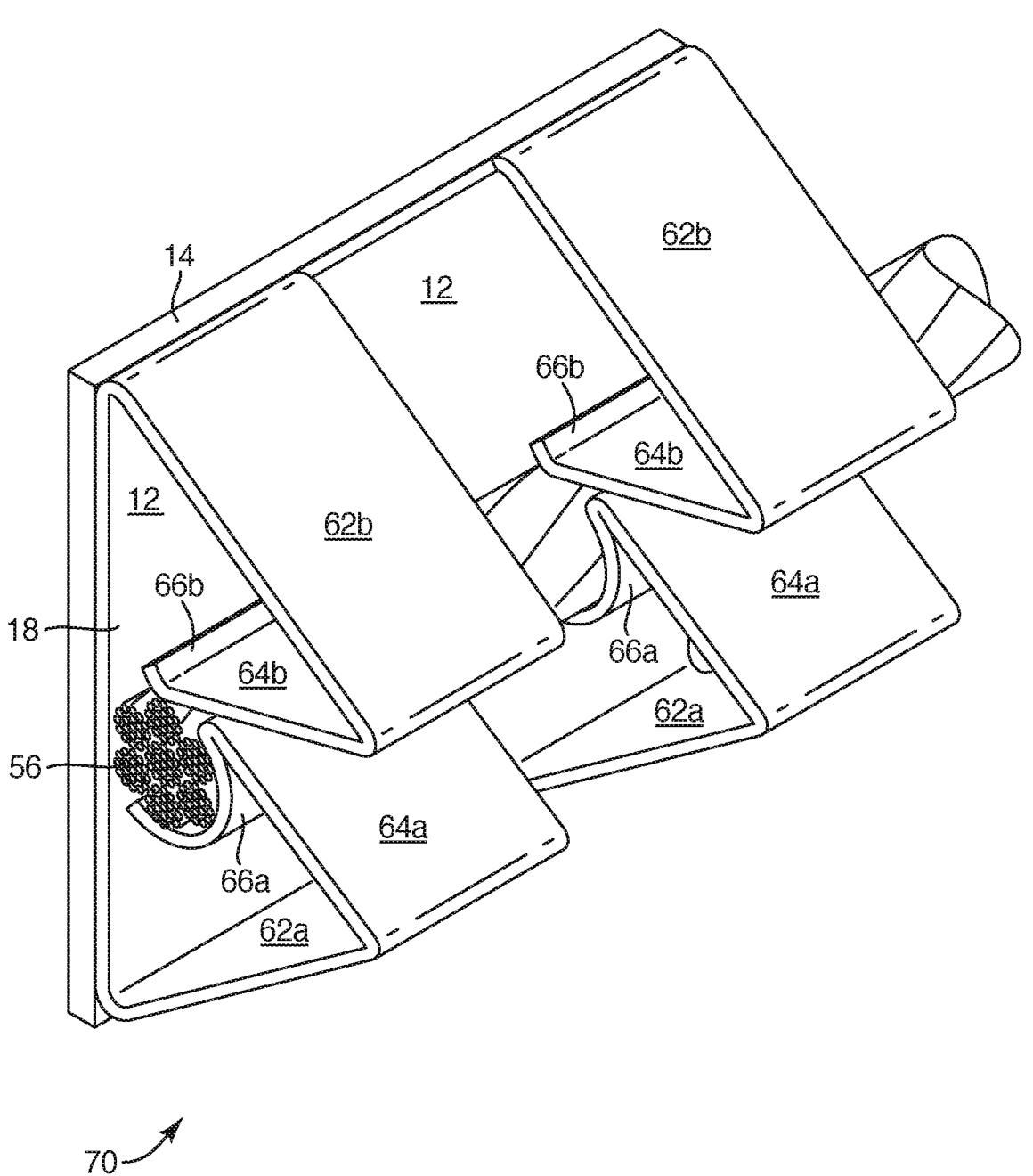
Figure 27A:
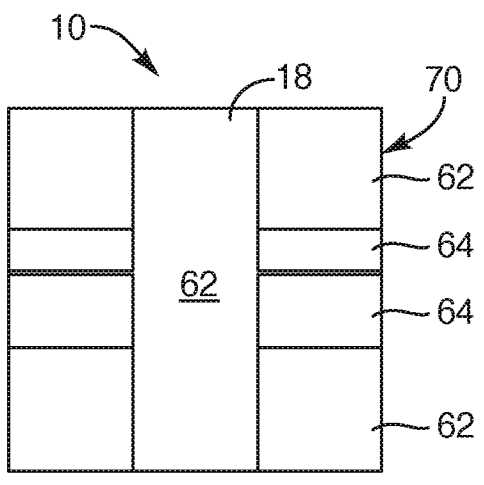
Figure 27B:
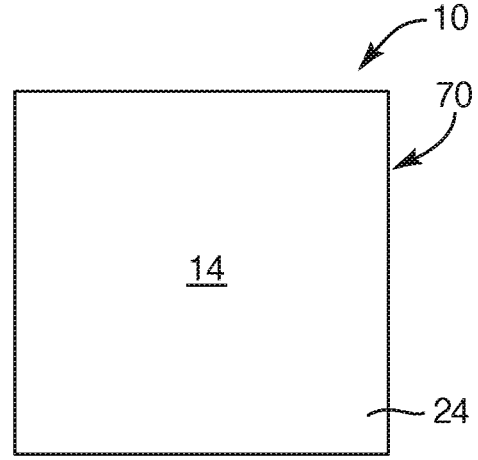
Figure 27C:
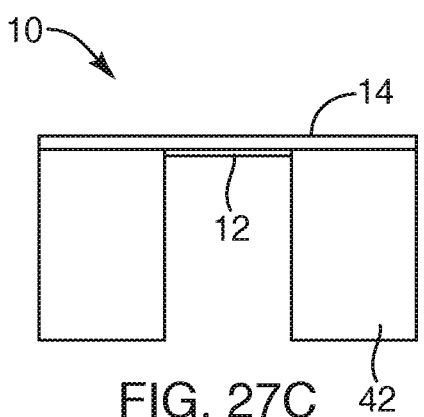
Figure 27D:
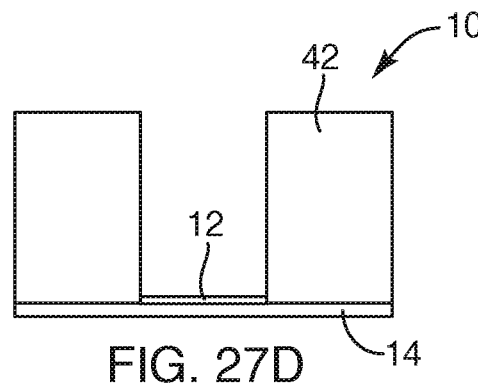
Figures 27E, 27F:
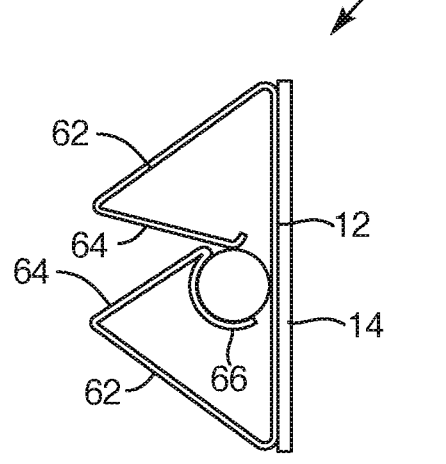
Figure 28:
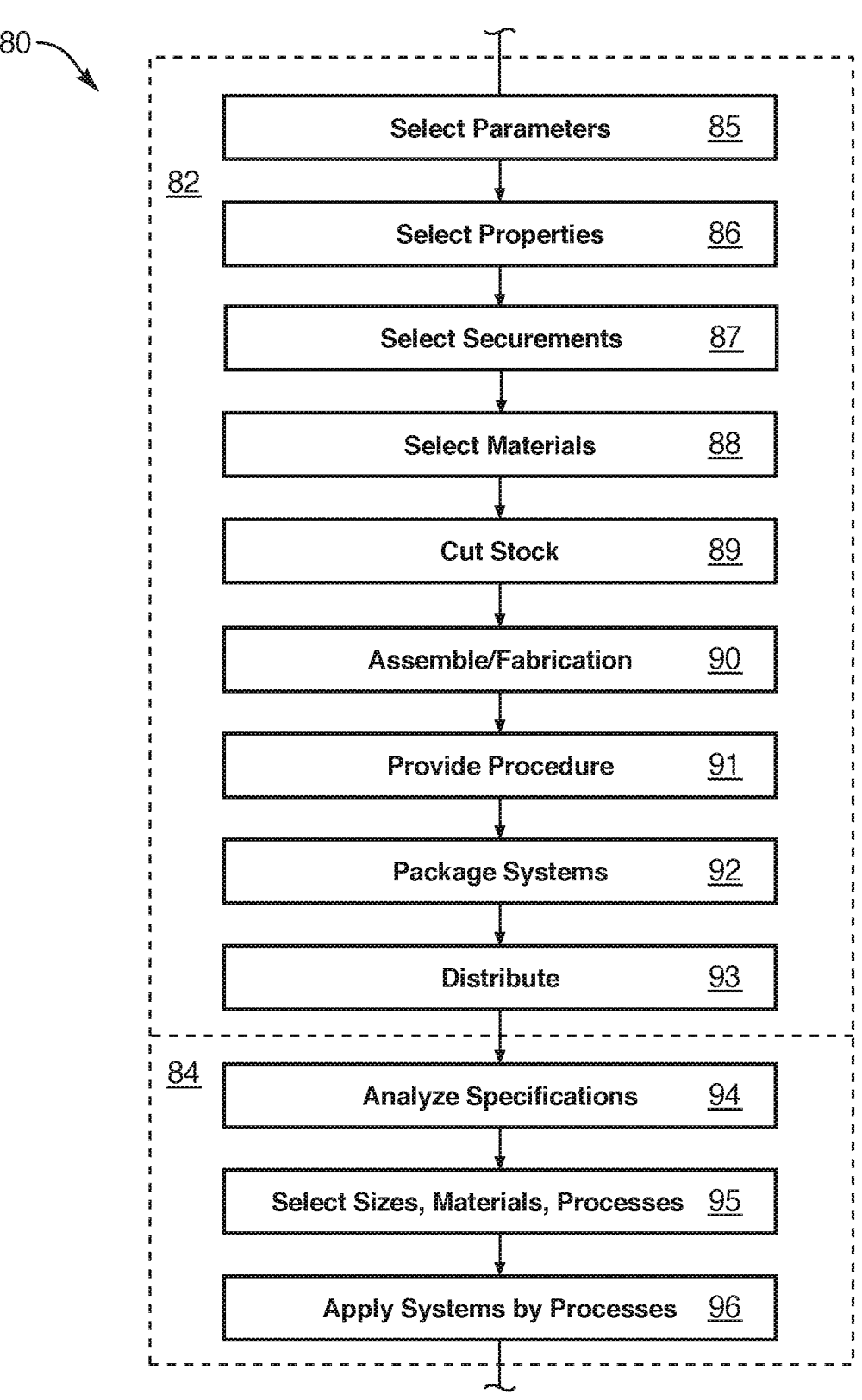
Figure 29:
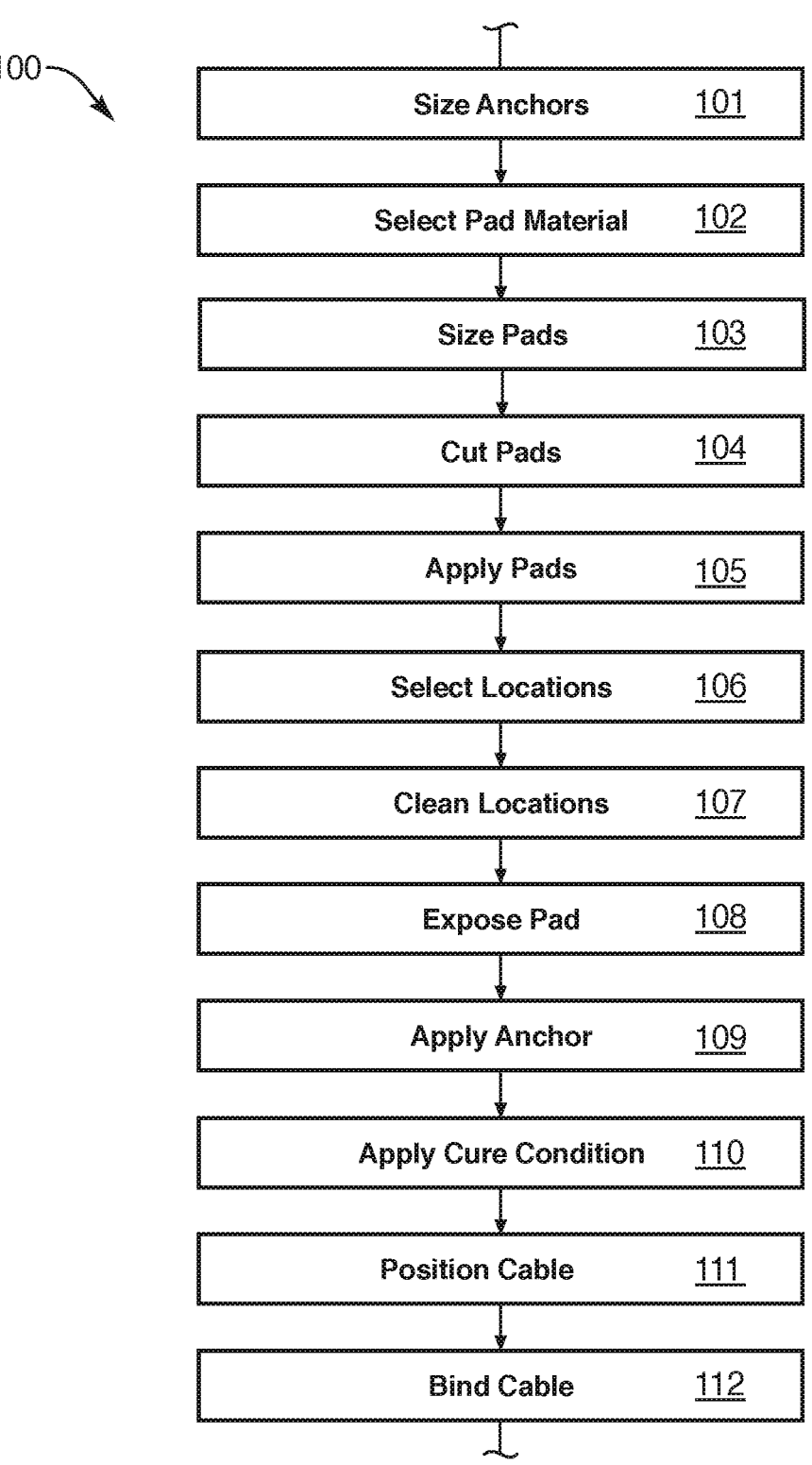
Figures 30, 31:
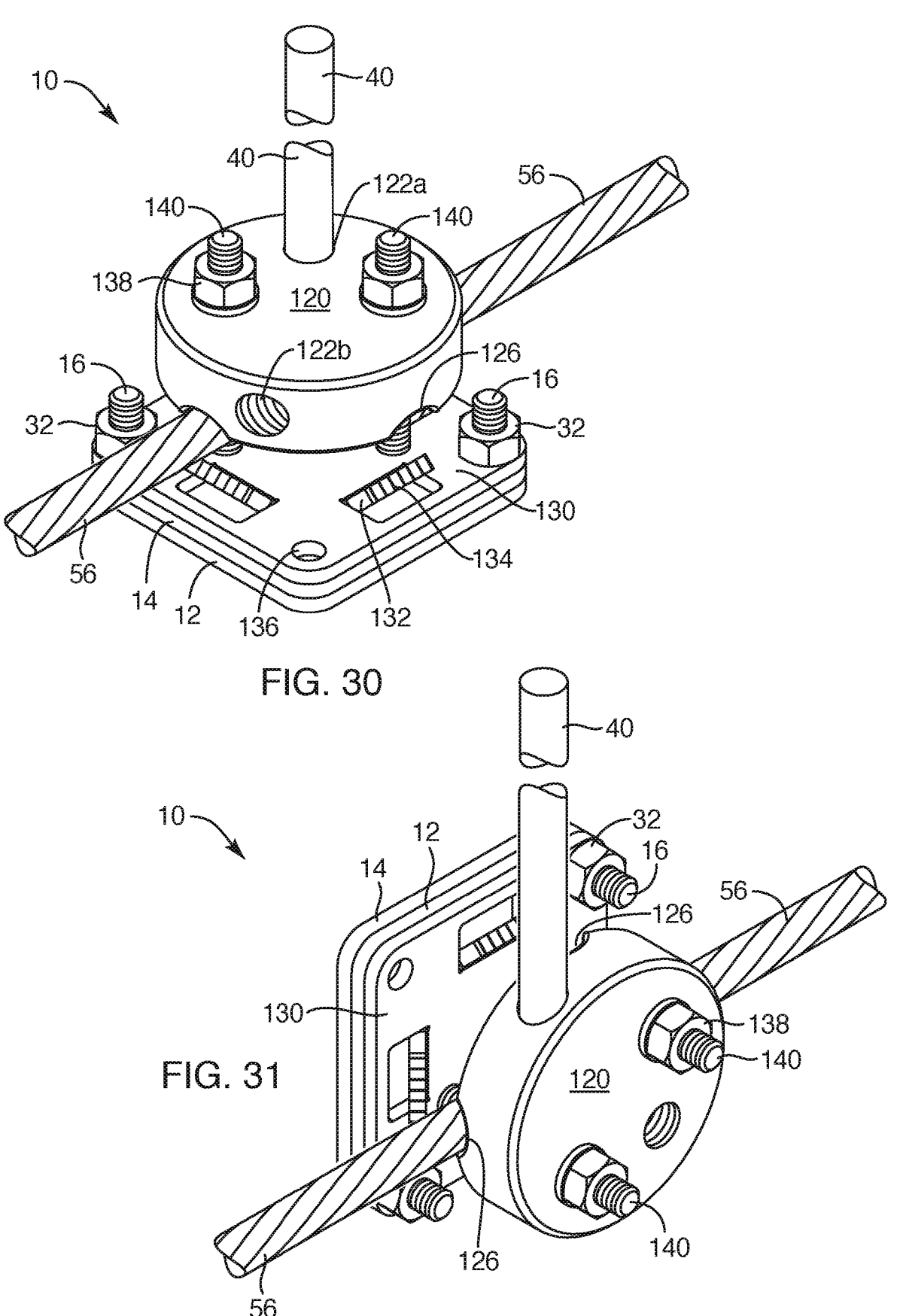
Figure 32:
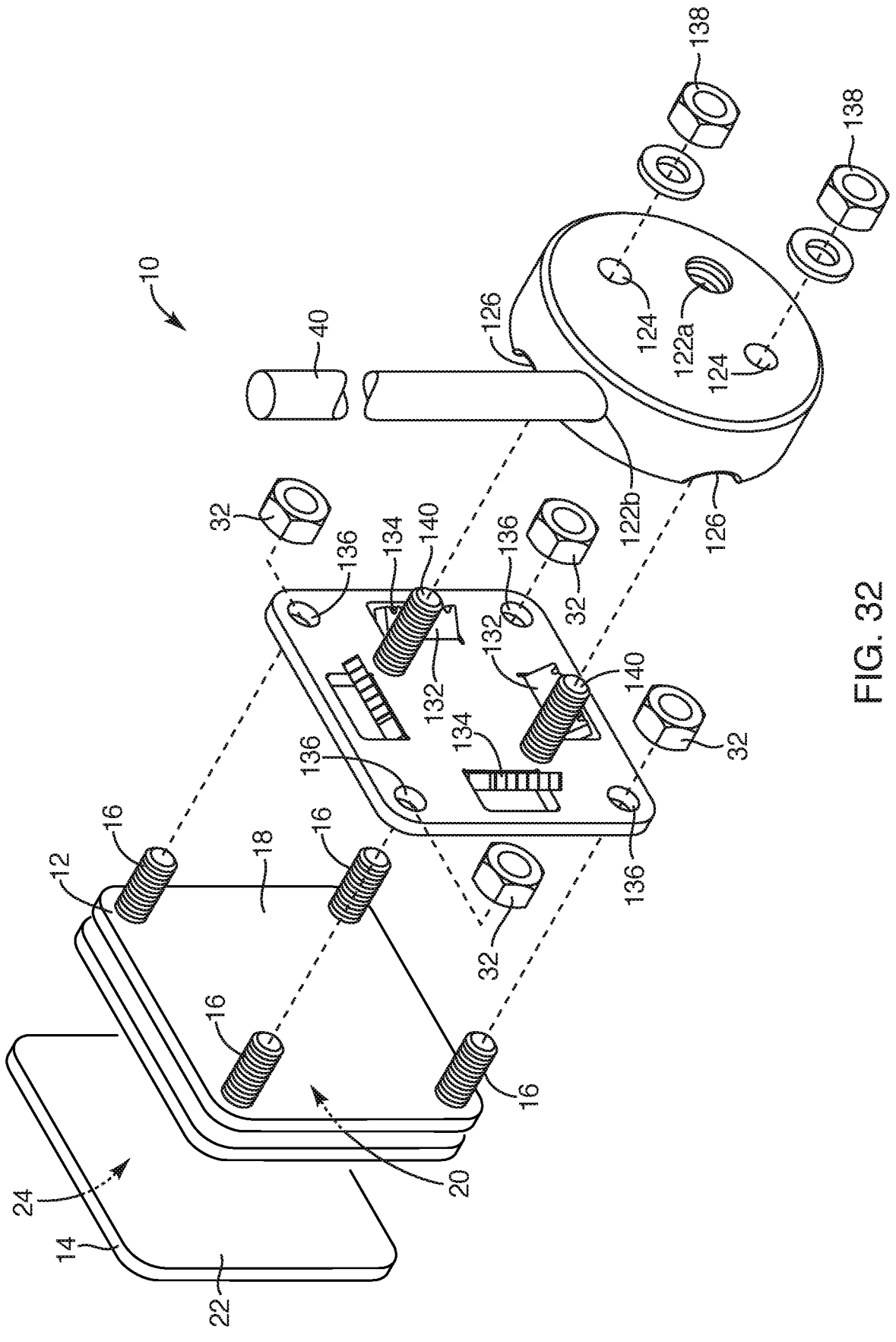
Figure 33:
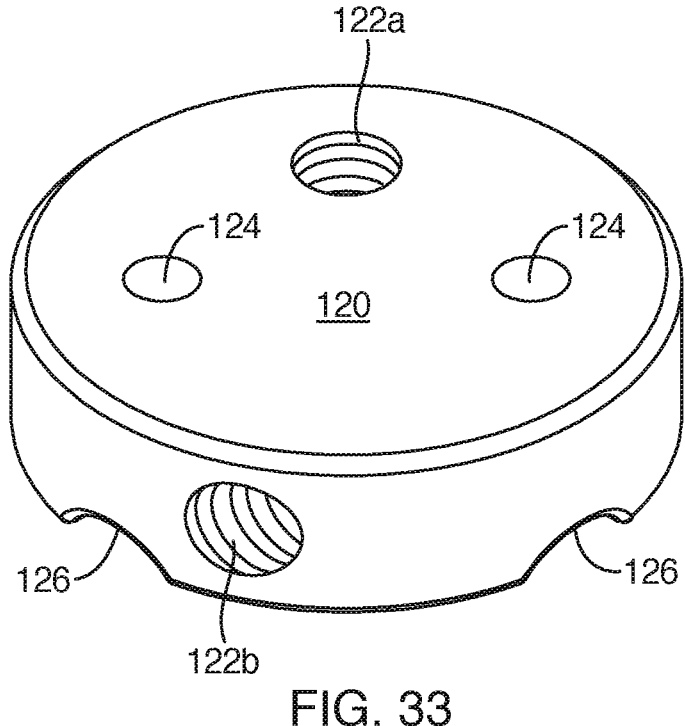
Figure 34:
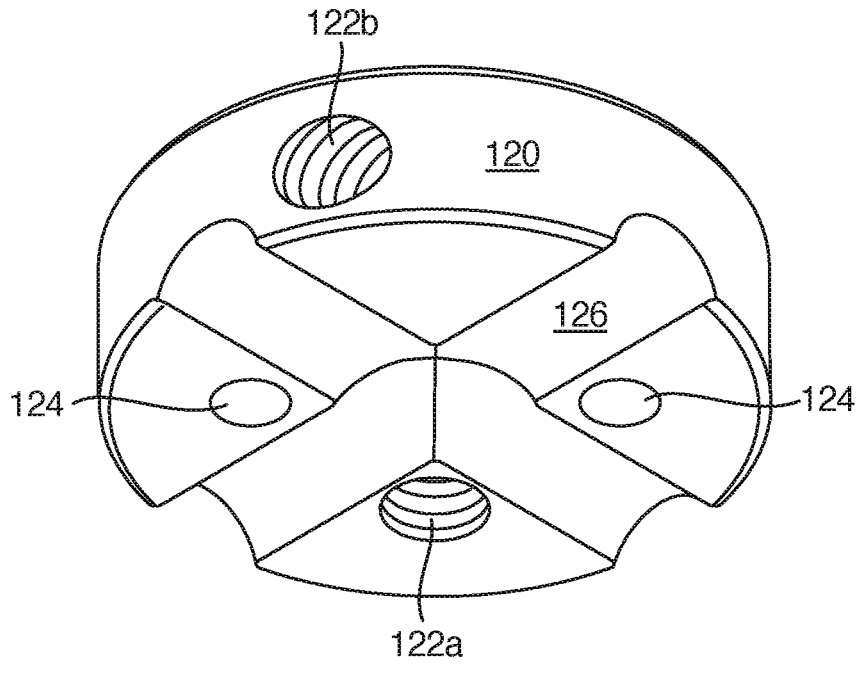
Figure 35:
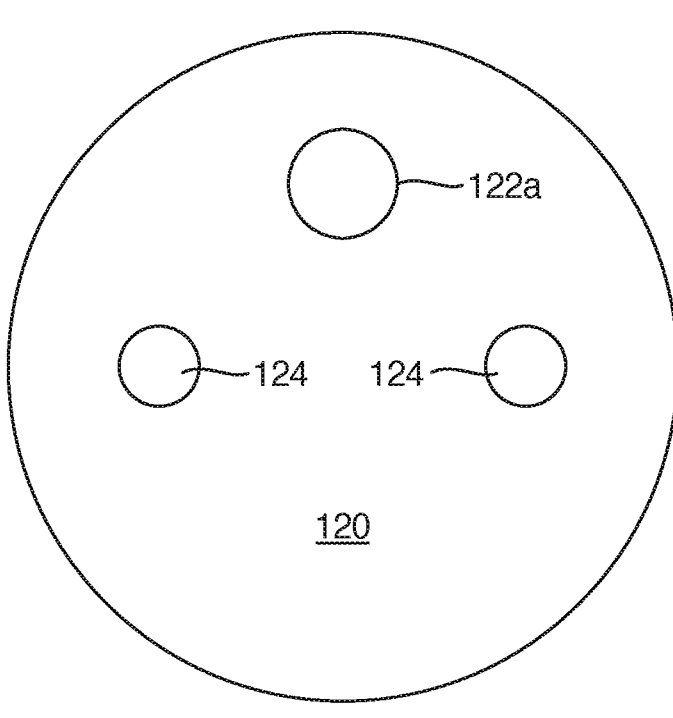
Figure 36:
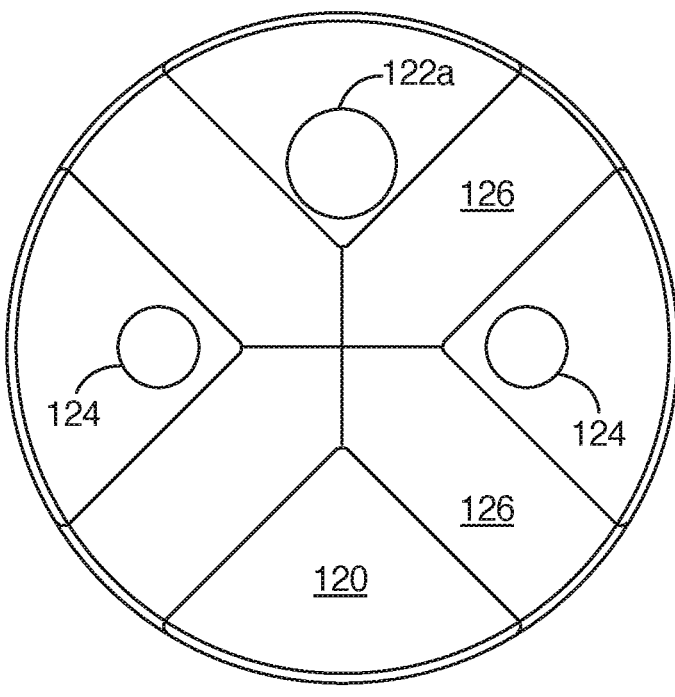
Figure 37:
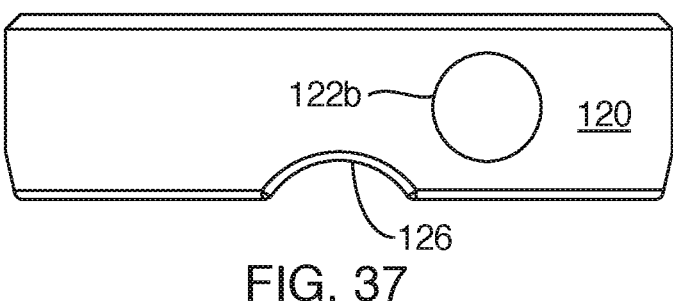
Figure 38:
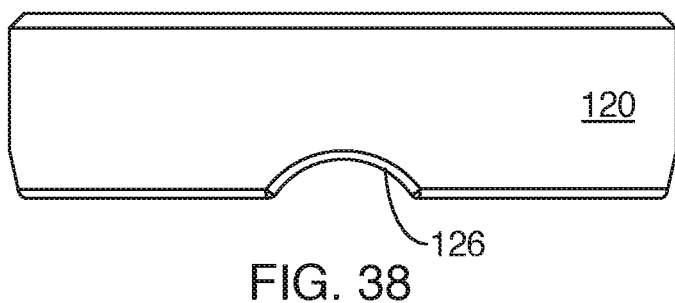
Figure 39:
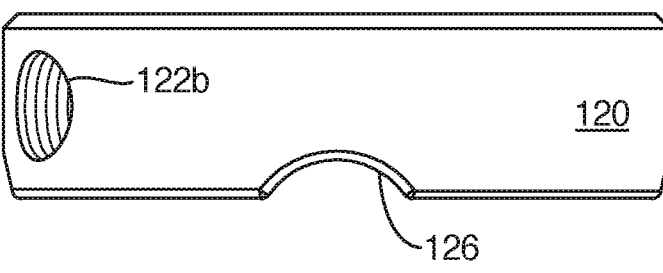
Figure 40:
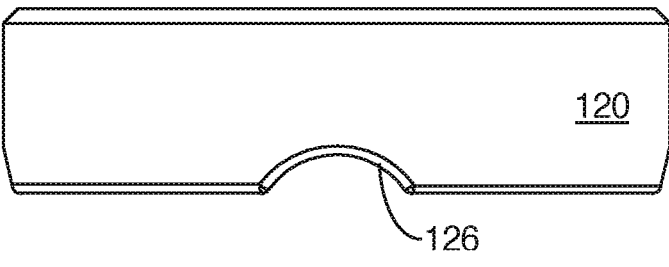
Figure 41:
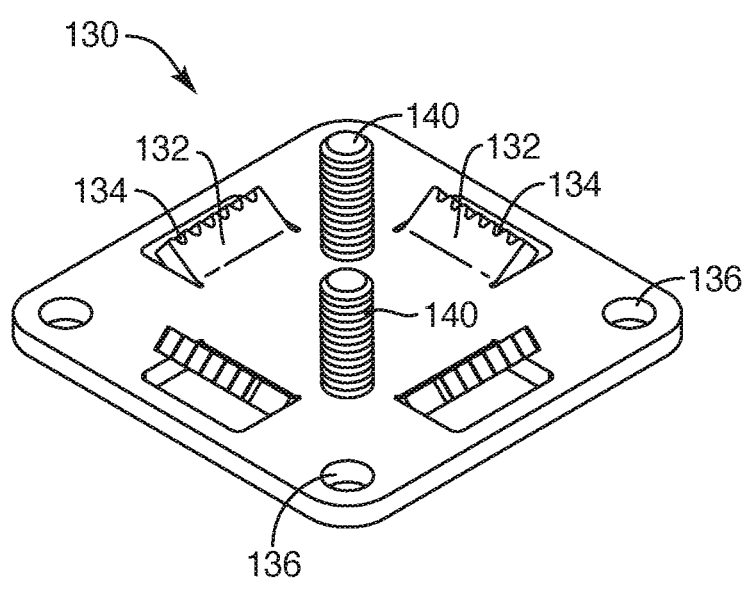
Figure 42:
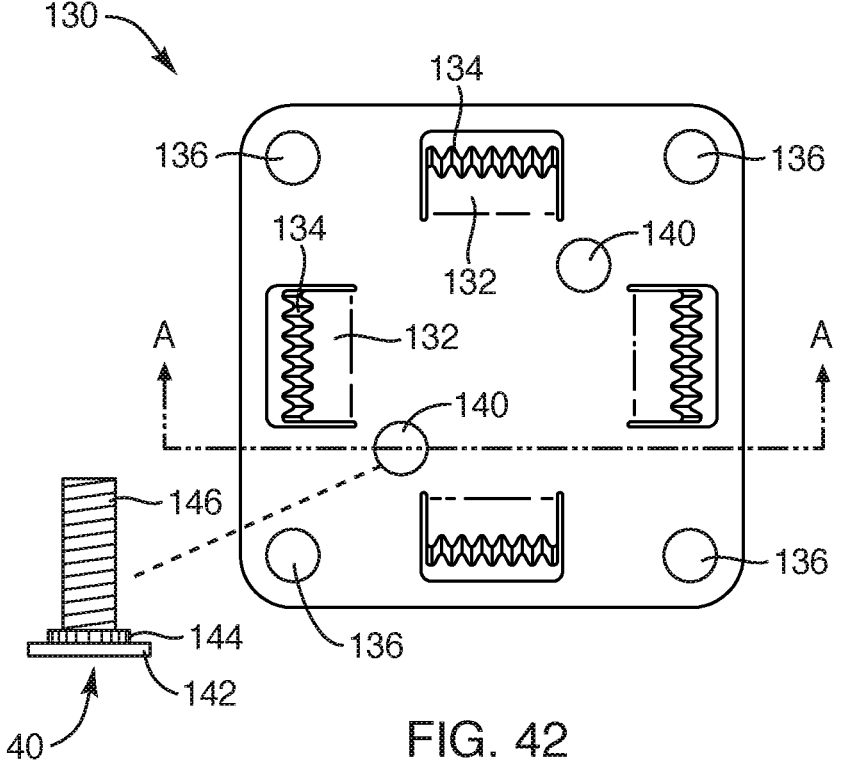
Figure 43:
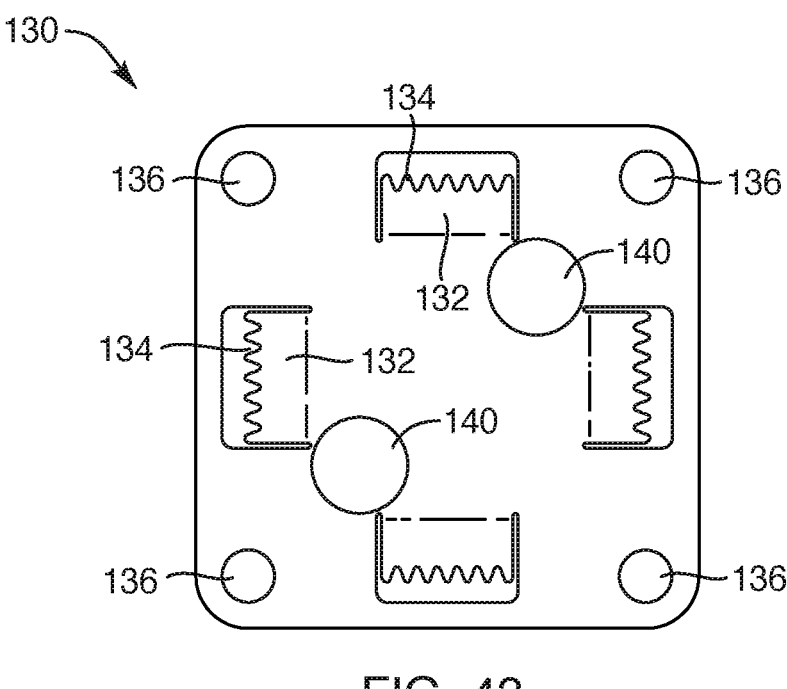
Figure 44:
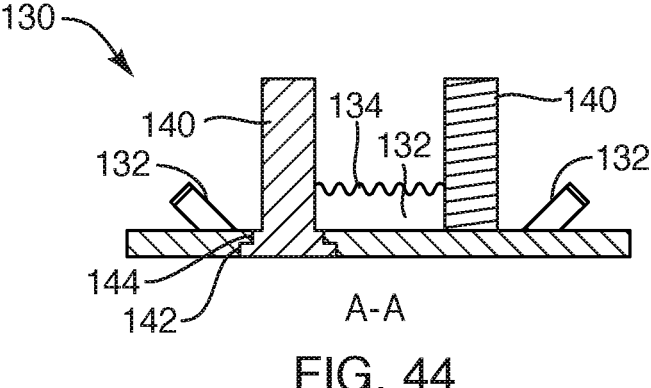
Figure 45:
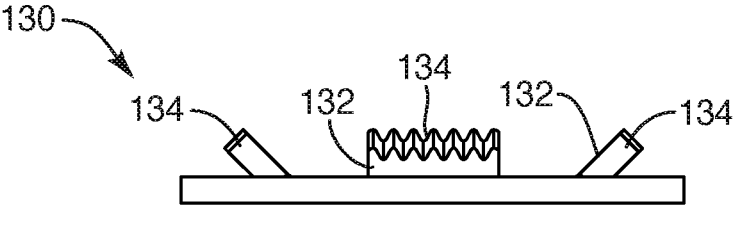
Figure 46:
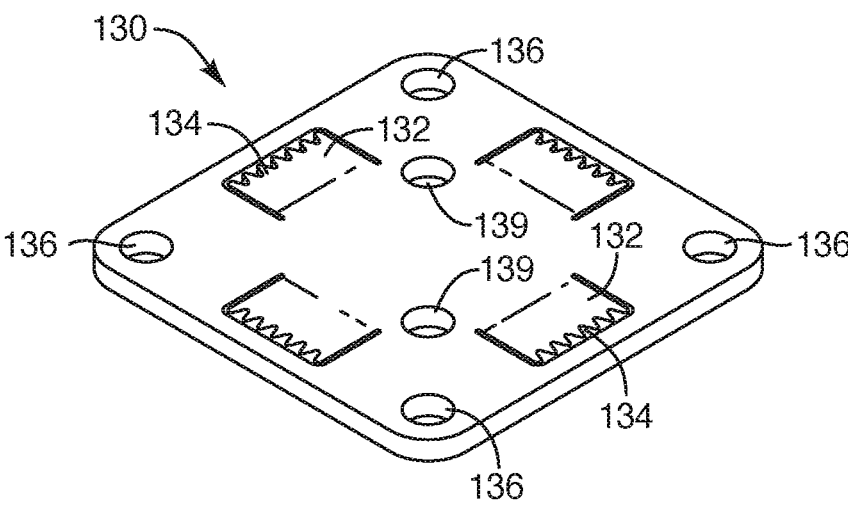
Figure 47:
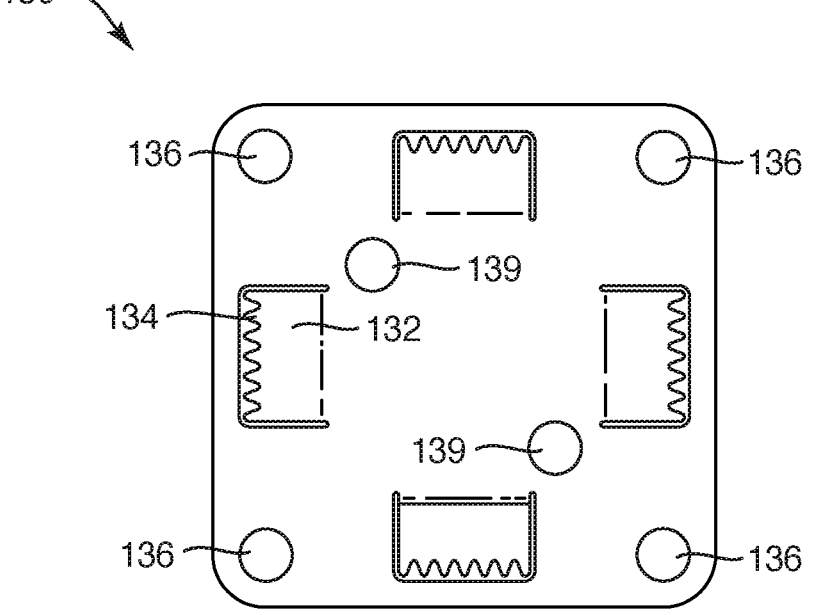
Figure 48:
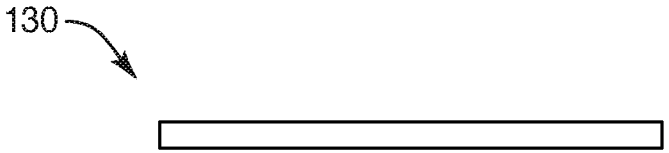
Figures 49, 50:
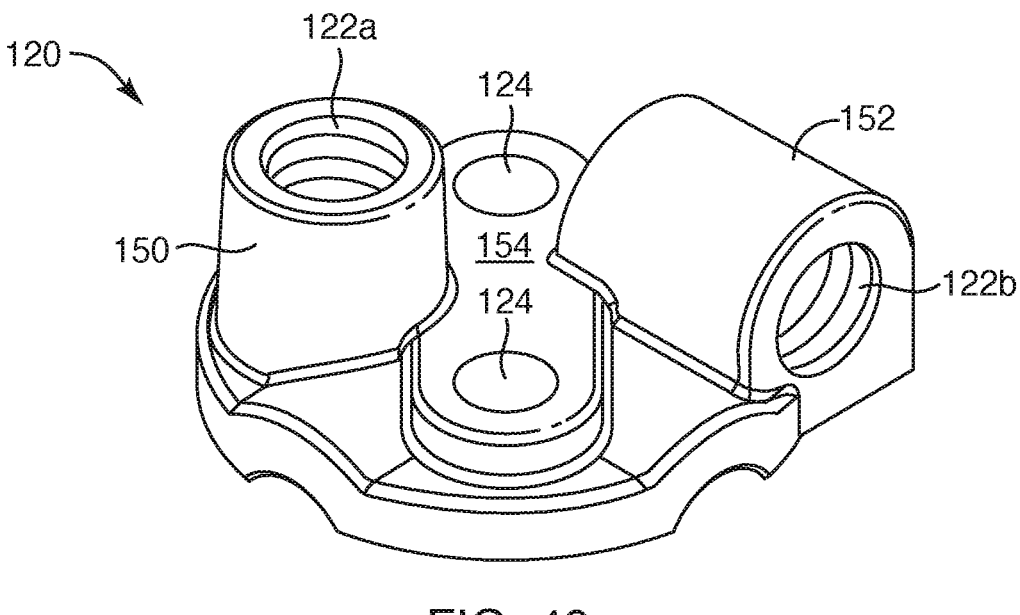
Figure 51:
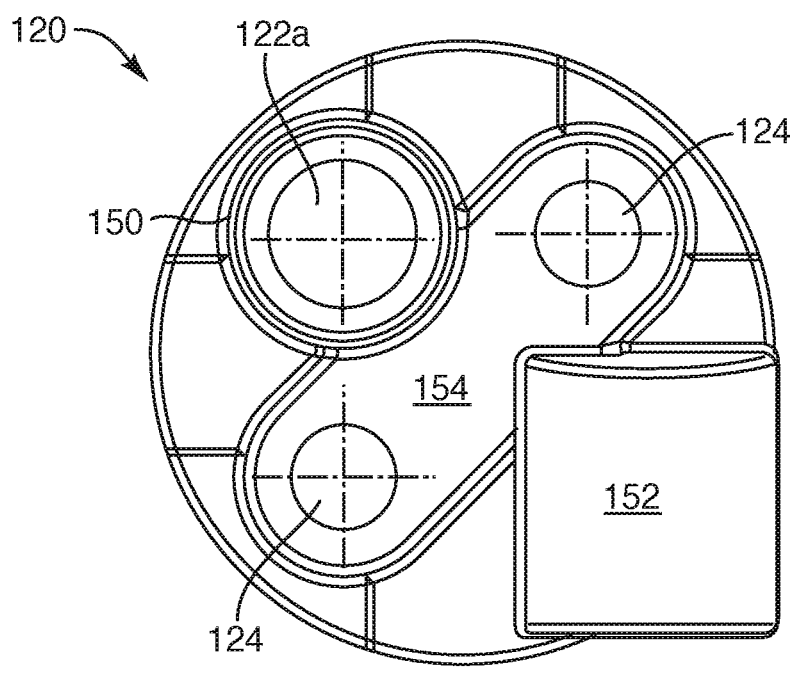
Figure 52:
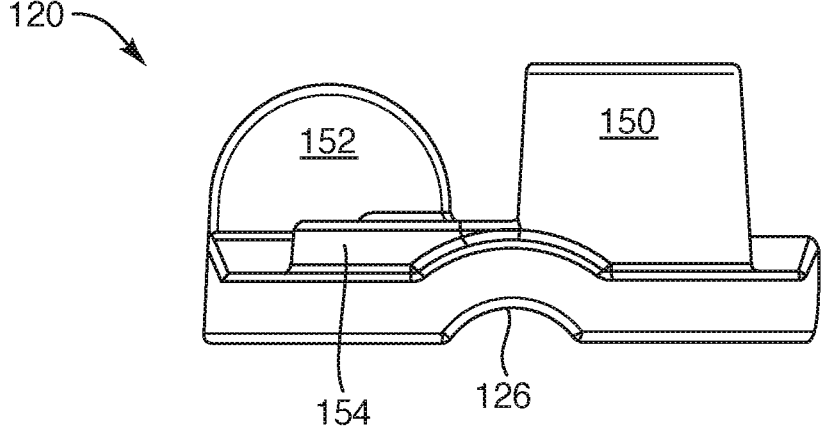
Figure 53:
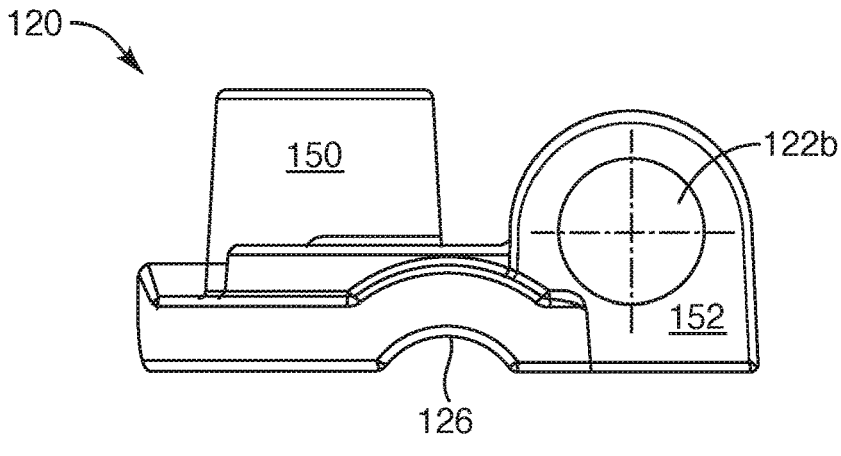
Figure 54:
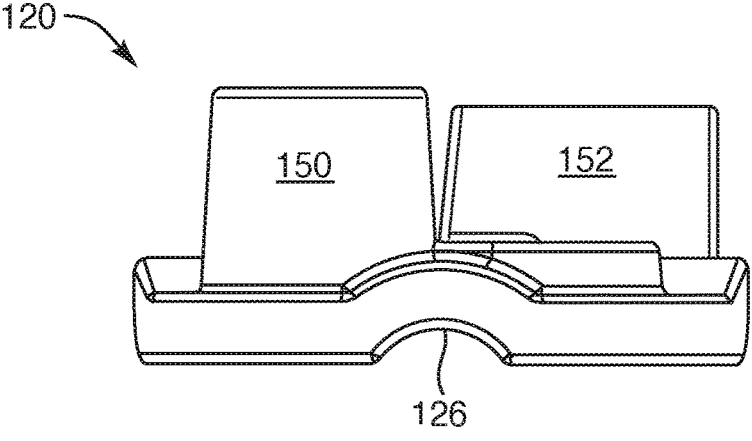
Figure 55:
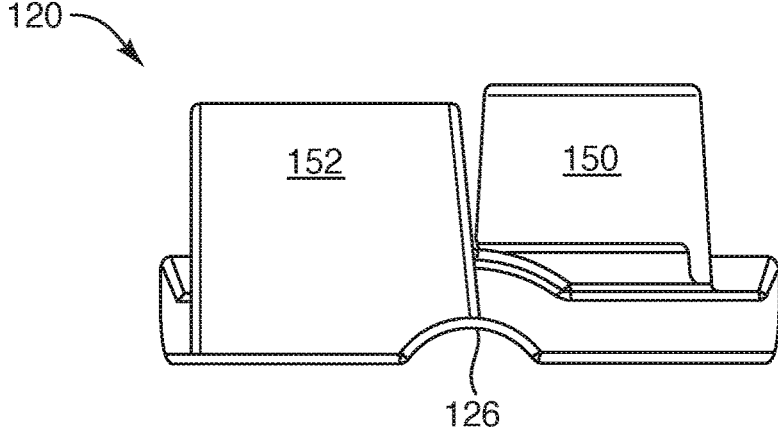

FIG. 18A is a front elevation view thereof;
FIG. 18B is a rear elevation thereof;
FIG. 18C is a top plan view thereof;
FIG. 18D is a bottom plan view thereof;
FIG. 18E is a left side elevation view thereof;
FIG. 18F is a right side elevation view thereof;
FIG. 19A is a frontal perspective view of an alternative embodiment relying on a diamond shape for the base plate of the anchor;
FIG. 19B is a rear perspective view thereof;
FIG. 19C is a front elevation view thereof;
FIG. 19D is a rear elevation view thereof,
FIG. 19E is a top plan view thereof,
FIG. 19F is a bottom plan view thereof,
FIG. 19G is a left side elevation view thereof,
FIG. 19H is a right side elevation view thereof,
FIG. 20 is an exploded view of one embodiment of an anchor in accordance with the invention, this having two studs rather than a single stud as in FIGS. 1-19, and including an exemplary bracket with fasteners, a point, and so forth;
FIG. 21 is a partially cut away, exploded view and assembly view of two embodiments of brackets for anchoring cables with the anchors in accordance with the invention;
FIG. 22 is a frontal perspective view of an alternative embodiment of a universal anchor providing quick insertion and retention of cables in an anchor system in accordance with the invention;
FIG. 23A is a front elevation view thereof;
FIG. 23B is a rear elevation view thereof;
FIG. 23C is a top plan view thereof;
FIG. 23D is a bottom plan view thereof;
FIG. 23E is a left side elevation view thereof;
FIG. 23F is a right side elevation view thereof;
FIG. 24 is an exploded view of the anchor of FIG. 22 illustrating the presence of the securant pad behind the base plate thereof and the cable to be inserted therein;
FIG. 25 is an assembled view of the anchor of FIGS. 22-24, secured to a covering or cap such as a flashing over a wall or parapet at the top of a building;
FIG. 26A is a frontal perspective view of an alternative embodiment of a universal anchor, this having an ability to completely cover the front of the secured cable;
FIG. 26B is a frontal perspective of the embodiment of FIG. 26a, illustrating a cable, shown in a partially cut away view and retained therein;
FIG. 27A is a front elevation view of the embodiment of FIGS. 26A-26B;
FIG. 27B is a rear elevation view thereof;
FIG. 27C is a top plan view thereof;
FIG. 27D is a bottom plan view thereof;
FIG. 27E is a left side elevation view thereof;
FIG. 27F is a right side elevation view thereof;
FIG. 28 is a schematic block diagram of one embodiment of a method for manufacturing and installing anchors in accordance with the invention, such as the anchors of FIGS. 1-27;
FIG. 29 is a schematic block diagram of the details of one alternative embodiment of a method for using an anchor in accordance with the invention.
FIG. 30 is a perspective view of the system of FIG. 1 with the point mounted to extend from a mounting head affixed to a horizontal surface of a protected structure; structure;

FIG. 31 is a perspective view of a point anchoring system in accordance with the invention with the point oriented vertically from a vertical mount on a vertical surface of a protected FIG. 32 is an exploded view thereof;

FIG. 33 is an upper frontal perspective view of the head in a horizontal orientation;

FIG. 34 is an under side frontal perspective view of the head of FIGS. 1 through 3;

FIG. 35 is a top plan view thereof;

FIG. 36 is a bottom plan view thereof;

FIG. 37 is a front elevation view thereof;

FIG. 38 is a rear elevation view thereof;

FIG. 39 is a right side elevation view thereof;

FIG. 40 is a left side elevation view thereof;

FIG. 41 is a perspective view of the cleat plate or mandible of the system of FIGS. 1 through 3;

FIG. 42 is a perspective view of the blank for the mandible or cleat plate of FIG. 11;

FIG. 43 is a top plan view of the cleat plate or mandible of FIG. 11;

FIG. 44 is a bottom plan view thereof;

FIG. 45 is a front elevation view thereof, which is identical to the rear elevation view, left side elevation view, and right side elevation view thereof;

FIG. 46 is a top plan view of the blank for a cleat plate or mandible of FIGS. 11 through 15;

FIG. 47 is a front elevation view thereof, which is identical to the rear elevation view, left side elevation view, and right side elevation view thereof;

FIG. 48 is a front elevation view of the cleat plate or mandible of FIGS. 11 through 17, with the racks and teeth deflected to their operational positions, but absent the studs that are installed to complete the mandible;

FIG. 49 is a frontal, upper quarter, perspective view of an alternative embodiment for a head for securing an air terminal or point;

FIG. 50 is a perspective view of the base thereof rotated 90 degrees;

FIG. 51 is a top plan view thereof;

FIG. 52 is a front elevation view thereof;

FIG. 53 is a rear elevation view thereof;

FIG. 54 is left side elevation view thereof;

FIG. 55 is a right side elevation view thereof; and

Figure 56:
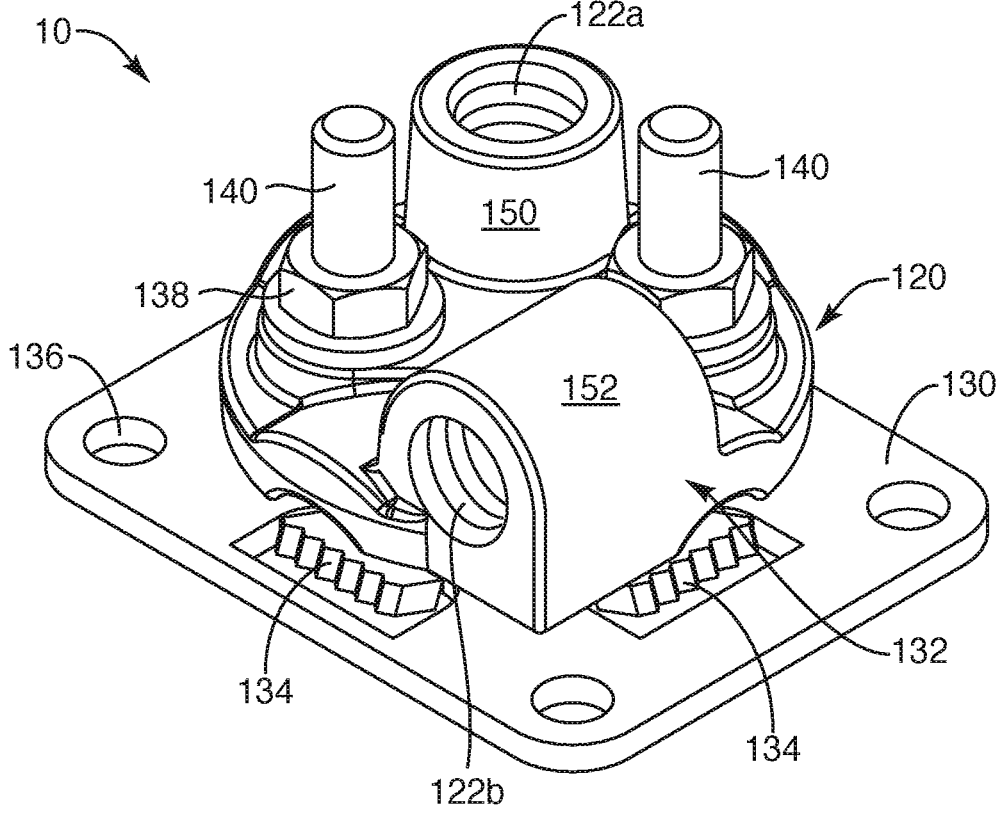

FIG. 56 is a rear, upper quarter, perspective view of an assembled head and mandible or cleat plate thereunder.

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, and generally to FIGS. 1-21, an anchor 10 may be formed to have a base plate 12. The base plate 12 will typically be secured to a building in order to support lightning protection cabling interconnecting several points or rods extending upward to cause a high voltage stress field around the distal end or tip thereof.

Accordingly, such points are typically formed of rod of a suitable diameter, and having a length of from about 8 to about 24 inches. Accordingly, each of these points tends to cause a stress concentration field of voltage potential about the distal end thereof. This preferentially causes each of these tips of these points or rods to be the first items struck by lightning, rather than having other structural or electrical components of the building take such a risk.

Anchors 10 in accordance with the invention may be distributed around walls, parapets, cupolas, or other extremities of a building. Typically, a ridge line, a parapet around a roof region, or the like may receive the anchors 10. The anchors 10 will support various fasteners (a term of art in lightning protection technology), which may be thought of as mechanical brackets, or other securement mechanisms to hold cables, the points, and so forth.

The base plate 12 may be fabricated with a stud 16, in a manufacturing process similar to that of manufacturing a bolt, a nail, or the like. In an alternative embodiment, the studs 16 may be attached to the base 12 after individual fabrication of each 12, 16.

The base plate 12 may be provided with a pad 14 that operates as a seal, and adhesive mechanism, a thermal expansion attenuator, a strain attenuator, and so forth. That is, between the base plate 12 and a corresponding portion of a building, a differential in coefficient of thermal expansion may exist. Similarly, temperature variations may change properties.

Likewise, freezing and thawing may intervene in capillary spaces between the base plate 12 and a building. A freeze-thaw cycle will eventually separate the base plate 12 of the anchor 10 from the building. Accordingly, the pad 14 may be, for example, a closed-cell foam of a particular type suitable for the task to form a seal. Likewise, the pad 14 may be provided with an adhesive material on the opposing surfaces faces in order to bond to a building and to the base plate 12.

In certain embodiments, the pad 14 has been found to serve well if fabricated of an acrylic expanded foam or expanded acrylic, commonly known as a foam. Likewise, various acrylate adhesives have been found suitable for rendering the pad 14 pressure sensitive, curable or both in bonding to the base 14.

Referring to FIGS. 1-2, as well as FIGS. 3-19 (including 19A-19C) illustrate various embodiments of an anchor 10. In these embodiments, the stud 16 protrudes at a right angle or perpendicularly with respect to the front face 18 or surface 18 of the base plate 12. Meanwhile, the back face 20 or surface 20 of the plate 12 receives the pad 14. The pad 14 is mechanically adhered thereto to support the stress, strain, tension, compression, and shear that may be applied to the pad 14 by loads introduces through the studs 16 to the base 12.

Meanwhile, the face 22 or front face 22 of the pad 14 adheres by way of an adhesive applied thereon or forming the face 22 thereof. This will bond to the back face 20 of the base plate 12. Similarly, the rear face 24 or surface 24 of the pad 14 is also provided with an adhesive quality, whether applied as a separate material, or as an integral part of the pad 14. The face 24 may be covered with a protective layer, not shown, in order to protect the face 24 against debris, and maintain it completely clean and operable. Removing the layer exposes the adhesive for adhering the rear face 24 to a suitable surface in a building.

The studs 16 may include a tip 26 formed as a screw or bolt. Typically, the tip 26 will be slightly tapered, in order to pilot the studs 16 into a threaded fastener or keeper, such as a nut.

At the opposite end of the studs 16 is the root 28 and or root portion 28. The root portion 28 may or may not be threaded. That is, threads 30 near the tip 26 may receive a fastener, such as a keeper, nut, or the like. Meanwhile, if the threads 30 continue all the way to the root 28, then very thin materials may be held snugly against the front face 18 of the plate 12 by such fasteners. Nevertheless, in some embodiments, the threads 30 need not proceed all the way to the root 28 of the studs 16.

Referring to FIGS. 3-19, note that trailing letters indicate drawings or figures in a set, having some relationship. Thus, herein, the text may refer to FIG. 19, to include FIGS. 19A, 19B, 19C, and so forth. FIGS. 3-8 illustrate the orthogonal views of the apparatus of FIGS. 1 and 2. FIG. 2 illustrates a partially cut away pad 14 in order to illustrate the back surface 20 of the plate 12. In some embodiments illustrated herein, the pad 14 will be removed, and only the plate 12 and stud 16 of the anchor 10 will be illustrated. In other embodiments, or illustrations the pad 14 will be in place. In FIGS. 3-8, the various orthogonal embodiments illustrate the rectangular, or square plate 12 with its associated studs 16.

Figure 9:
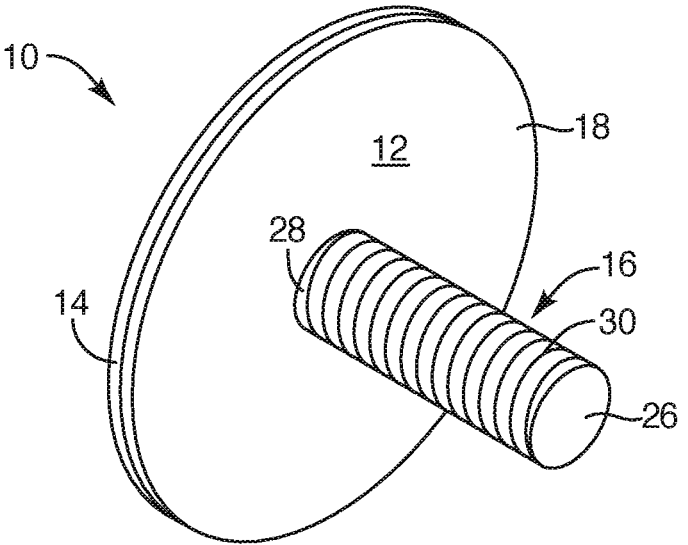
FIG. 9 is a frontal perspective view of an alternative embodiment relying on a circular base plate for the anchor of FIG. 1.
Figure 10:
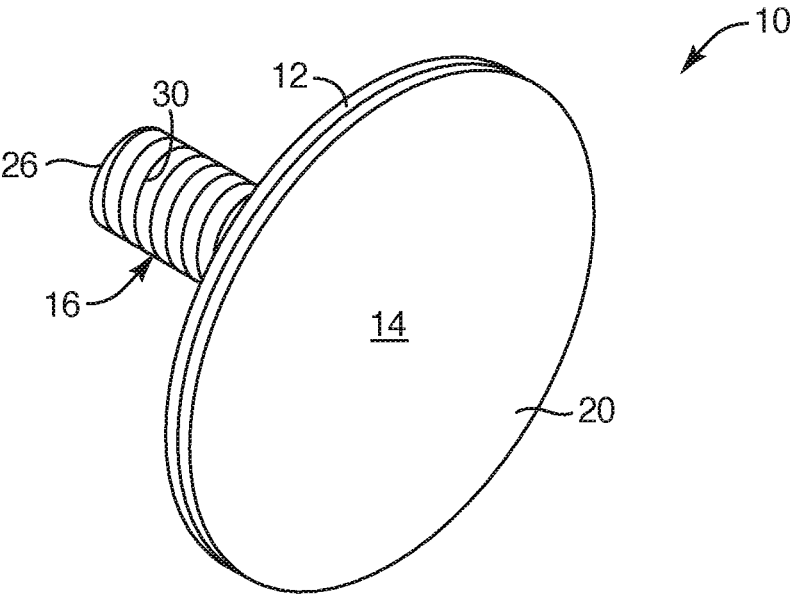
FIG. 10 is a rear perspective view thereof.

Referring to FIGS. 9-10, a perspective view from the front and rear of an alternative embodiment is shown, relying on a circular plate 12. One advantage of a circular plate 12 is that orientation of the plate 12 becomes less significant. For example, with a rectangular or otherwise cornered plate 12, orientation will be obvious to the eye of a casual observer. In contrast, a circular plate 12 is point symmetric and need not be oriented in a specific manner in order to operate and yet to appear aesthetically pleasing.

Referring to FIGS. 11-16, the various orthogonal views of the embodiment of FIGS. 9-10 look very similar to those of FIGS. 3-8.

Referring to FIGS. 17A-17B, a frontal and rear perspective view of an oval embodiment of a base plate 12 needs to be oriented, but the precision required of straight lines may not be required. In this embodiment, the long axis of the elliptical or oval shape will typically be oriented vertically in order to provide more leverage advantage by the base plate 12, and particularly, a pad 14. In this way, the leverage of the studs 16 will be reduced against peeling or tipping the base plate 12 and pad 14 away from a wall to which it is attached.

Referring to FIGS. 18A-18F, the orthogonal views of the embodiment of FIGS. 17A-17B are illustrated. Again, these views appear very similar to those of FIGS. 11-16, with a major and minor axis, rather than a single diameter.

Referring to FIGS. 19A-19B, a diamond shape may be suitable for one embodiment of a plate 12 in accordance with the invention. In this embodiment, the vertical dimension is a maximum, again providing additional leverage, compared to a square embodiment. Even if the square embodiment of FIGS. 1-2 were installed in a diamond configuration, the maximum vertical dimension of the installed plate 12 would have about 40% more length. This may provide, accordingly, more leverage, and a greater supporting "moment" as that terms is used in engineering.

Referring to FIGS. 19C through 19H, various views (front elevation, rear elevation, top plan, bottom plan, left side elevation, right side elevation, respectively) of the embodiment of FIGS. 19A-19B illustrate that the other orthogonal views are unnecessary in order to have a clear understanding of the shape from each direction. Again, this embodiment militates in favor of a comparatively precise orientation. This is not so much for mechanical strength, which would very little with a matter of a few degrees of rotation of the plate 12 against the surface. Rather, it is valuable for aesthetics, where any orientation away from vertical would be immediately noticeable to a casual observer.

Referring to FIG. 20, an exploded view of one embodiment of an anchor 10 in accordance with the invention illustrates the pad 14 backing the base plate 12 to which the studs 16 are secured, fabricated, attached, or integrally manufactured. In this embodiment, a keeper 32, such as a nut 32 is used to thread onto the threads 30 of the stud 16. This will secure a fastener 34 to the plate 12, and thus to the mounting surface 35 of a building.

In this embodiment, the studs 16 pass through apertures 36, thus making themselves available for receiving the keeper 32 or the nut 32. As each nut 32 is threaded toward the root 28, beginning at the tip 26 of the stud 16, the fastener 34 is drawn toward the front face 18 of the base plate 12. In the illustrated embodiment, a stand off 38 extends away from the base plate 12, in order to support a point 40. The point 40 is shown in engineering style with the intermediate length continuing as the portions illustrated.

In this embodiment, the point 40 may be secured by a securement 42 such as a set screw 42 threaded into a receiver 44 that mounts the point 40 to support it in a vertical orientation. As described hereinabove, the point 40 operates to draw lightning, by increasing the voltage stress field near the distal end thereof (farthest from the building).

Referring to FIG. 21, while continuing to refer generally to FIGS. 1-29, an installation of an anchor 10 in accordance with the invention may include attachment of an anchor 10 by a pad 14 to a surface 35 of a building. In the illustrated embodiment, the surface 35 is part of a covered wall 52 or parapet 52. The parapet 52 or wall 52 is simply used by way of example.

In other embodiments, the surface 35 may be part of a covering on a ridge line or ridge cap from a building, a cupola, gable, eave, or other architectural feature that represents a high point in the structure of a building. Accordingly, the parapet 52 or wall 52 represents allocation that permits the point 40 to be the high point of the building by selecting a surface 35 to which the anchor 10 may be installed.

Thus, the installation 50 or assembly 50 may include, for example, an anchor 10 secured by a pad 14 against a surface 35 of a flashing 54 or cap 54 covering a portion of a wall 52.

In the illustrated embodiment, the cap 54 or flashing 54, may include a drip edge 55. The drip edge 55 is instructive. Significant effort is taken to assure protection of the wall 52 against the elements, particularly rain, and the freeze-thaw cycle of winter moisture. Accordingly, the drip edge 54 proceeds away from the wall 52, in order to assure that water striking the flashing 54 or cap 54 is conducted away therefrom. This may assure that it drips elsewhere, rather than feeding capillary spaces between the wall 52 and the flashing 54. Likewise, the drip edge 55 militates against water dripping directly from the flashing 54 onto the wall 52.

In the illustrated such as the one embodiments, illustrated in FIG. 21, a cable 56 is secured by the anchor 10 to run along the wall 52, attached to the surface 35 of the cap 54 or flashing 54. In the far left embodiment, as illustrated, the anchor 10 includes a base plate 12. Thus, the anchor 10a shows an assembled configuration of the anchor 10b also illustrated.

For example, a cable 56 is secured directly against the base plate 12 by tabs 58 that operate as extensions of the base plate 12. Tabs 58 fold over to hold the cable 56 in place. In some embodiments, such a simple, straightforward attachment mechanism may be operable without tools.

With the tabs 58 fully open, and extending as if within the plane of the base 12, an installer may press the pad 14 against the surface 35 of the flashing 54. This anchoring of the base 12 and pad 14 secures them to the surface 35 and may be used to secure them to each other. After applying pressure and waiting, or otherwise curing the securement of the pad 14 to the surface 35, an installer may then run the cable across the plate. Cable 56 may be fastened in place by bending the tabs 58 over the cable 56 and plate 12, and specifically over the front face 18 of the plate 12.

In the alternative embodiment of the anchor 10c, a location 60 may be selected, as shown in the exploded view, for receiving a pad 14 after suitable cleaning. Typically, the pad 14 here may be preinstalled on the anchor 10 at a factory, being secured to the base plate 12. Nevertheless, in some embodiments, the pad 14 may be applied in the field.

By whatever mechanism, the rear face 20 or back face 20 of the base plate 12 adheres to the pad 14, by being fastened to the front face 22 thereof. Meanwhile, the back face 24 of the pad 14, after a suitable cleaning of the surface 35 at the location 60, is adhered to the surface 35 at the location 60.

In the embodiments of the anchors 10c, and 10d, a stud 16 protruding from the base 12 receives a fastener 36, which fastener 36 actually holds the cable 56. In the illustrated embodiment, the fastener 34 is provided with an aperture 36 to receive the stud 16 therethrough. Accordingly, as illustrated in FIG. 20, a nut 32 or other keeper 32 may secure to the stud 16, thus capturing the fastener 34, and the cable 56 held by the fastener 34 to the base plate 12. Of course other embodiments of brackets may simply include loops, clamps, and the like simply supported by the stud 16 and base plate 12.

Referring to FIG. 22, which is detailed in FIGS. 22-25, a universal anchor 10 may provide a clip mechanism for quickly securing a cable 56 to a building wall 52. In the illustrated embodiment, the universal anchor 10 includes arms 62 that operate as springs, being able to deflect.

Near the center of the anchor 10, shown here in a vertical orientation, the arms 62 support a horizontal cable captured thereby. The anchor 10 may include a guide 64 or guide portion extending from the arm 62. Cable pushed between opposing guides 64, will tend to deflect the guides 64, and the arms 62 as cantilever springs. Upon opening a gap between the guides 64, a cable pressed into the guides 64 will move the guides 64 and arms 62 outboard. Moving in an outboard direction opens up a gap to receive the cable 56.

The retainers 66 will hold a cable 56 in place after the cable passes into the cable region 68. That is, after passing the guides 64, the cable no longer exerts the outboard pressure on the guides 64. The guides 64 and arms 62 may again return to their unstressed, unstrained positions, locking the cable 56 in place 68.

Typically, the vertex 69 tends to restrict the gap 63, thus requiring the guides 64 to push the arms 62 as cantilevers. The arms 62, acting as cantilever springs against the base 12, are moved away (outboard) until the vertex 69 of each guide 64 passes over a center line or center diameter of the cable 56. Thereafter, the retainers 66 tend to ride up on the cable 56, once in the cable region 68, thus drawing the cable in against the base plate 12. This occurs as the arms 62 close back over the cable 56 to their 62 original position. Thus, the retainers 66 operate to draw the cable in, against the plate 12 by force of the spring loads presented by the arms 62 and guides 64.

The anchor 10 may be referred to as a combined anchor and bracket 70 or a universal anchor 70. Thus, a particular embodiment of an anchor 10 that includes both the base 12 integrated with a mechanism for bracketing, without requiring an extra piece distinct from the base 12 as a fastener 34, may be considered a universal or integrated anchor 10.

Referring to Figures to 23A-23F, the various orthogonal views of the embodiment of FIG. 22 illustrate the details and approximate aspect ratios or relationships between dimensions. Meanwhile, these orthogonal views may be seen to present a universal anchor 70 or integrated anchor 70 that may be formed by simply cutting and bending a sheet of material. Thus, the material of the integrated bracket 70 or universal bracket 70 may typically be metal, although other materials may be suitable. For example, certain composite materials, polymeric materials, such as certain industrial plastics, and the like, may serve as the material for forming a universal bracket 70 as illustrated.

Referring to FIGS. 24-25, while continuing to refer to FIGS. 22-23, and FIGS. 1-29 generally, the integrated bracket 70 of FIG. 22 is illustrated in an exploded view with the pad 14 and cable 56 not secured. In FIG. 25, the assembly 50 includes the universal bracket 70 of FIGS. 22-24 in place, having the cable 56 installed, and the anchor 10 or universal anchor 70 installed on the surface 35 of a cover 54 of a wall 52. As mentioned hereinabove, the integrated anchor 70 or universal anchor 70 is a particular embodiment of an anchor 10.

Referring to FIGS. 26A-26B, in an alternative embodiment of a universal anchor 70, a base 12 may include arms 62 and guides 64 that are not necessarily symmetrical with one another. For example, in the illustrated embodiment, the lower arms 62 may be longer, or may be the same length as the upper arms of 62. Meanwhile, the guides 64 are typically not symmetrical, and may be shaped differently to fulfill different purposes.

For example, the lower guides 64 operate as guides, tending to bend or deflect away from a cable 58 inserted between the guides 64. Bending the arms 62 away from the cable 58. The upper arms 62, and the upper guides 64b operate similarly. As cantilever springs, each pull away from or draws away from the center or unloaded position according to the force applied by a cable 58 being forced between the guides 64.

However, unlike previous embodiments, the upper guide 64 terminates in a different shape than does the lower guide 64a. Thus, the lower guide 64a is a continuation or continues on as the retainer 66a. Meanwhile, the lip 66b is not so large, and simply provides a transition for the guide 64b. Herein, throughout this text, a trailing letter behind a reference numeral simply indicates a specific instance of the item identified by that reference numeral. Thus, a guide 64 is also capable of being a guide 64a, or guide 64b. Put another way, a guide 64a is a specific instance of a guide 64 generally, and all may be designated as a guide 64. Similarly, a guide 64b is a specific instance of a generic guide 64. In similar fashion, the retainer 66a provides an actual receiver 66a to hold and to completely cover a cable 58 when placed in the cable 56 when received in the cable region 68.

As illustrated, the cable 56, when forced toward the base plate 12 between the guides 64, tends to drive the guides 64 apart, acting as cantilever springs. Meanwhile, the guides 64, in turn, drive the arms 62 apart, also operating as cantilever springs with respect to the base 12. Once the gap 63 between the guides 64 has been traversed, the cable 56 may be drawn in by the retainers 66 as they close in together.

The spring force of the guide 64b pushes the detent 66 toward the cable 56. Accordingly, once the cable 56, driven in between the guides 64a, 64b has sufficient clearance, then the diameter of the cable 56 tends to drive the guide 64a upward, as the detent 66b and the arms 62 drive the guides 64b toward the cable 56, and toward the arms 62a. In this way, the upper arm 62b tends to drive the cable 56 into the retainer 66a.

In summary, an installer forces the cable 56 between the guides 64a, 64b. The guides 64a, 64b, acting as springs, deflect, also applying and transmitting force to their respective arms 62a, 62b. The combined deflection of the guides 64 and the arms 62 opens the gap 63 between the guides 64, thus receiving the cable 56. Upon the passage of the guide 64a over the central diameter or maximum diameter of the cable 56, the cable 56 is seated within the retainer 66a. Meanwhile, the combined forces of the guide 64b pushing the cable into the cable position 68 under the retainer 66a, is augmented by the force of the arms 62b driving the guides 64b and detent 66b against the cable 56, until the cable 56, is well into the retainer 66a.

Referring to FIGS. 27A-27F, while continuing to refer to FIGS. 26A-26B, one can see that the integrated anchor 70 provides a cover 66 or a retainer 66 over the outermost surface of the cable 56. Notwithstanding the embodiment of FIGS. 22-25, which can easily retain the cable 56, the embodiment of FIGS. 26A-27F provides a positive element 66 covering the outside of the cable 56.

Referring to FIG. 28, a process 80 of using an anchor 10 in accordance with the invention may include both a manufacturing process 82 and an installation process 84. For example, in certain embodiments, the anchor 10 may actually be assembled onsite. In other embodiments, the anchor may be completely manufactured, assembled, and simply applied to a wall.

As discussed hereinabove, in certain embodiments brackets 34 may be selected according to a specific need. They may be used to support a cable, a point, or a specialty item in a lightning-protection circuit. In certain embodiments of an anchor 10 in accordance with the invention, brackets 34 may be conventional, they may be mounted to support cables, points, or the like on a structure of a building by an anchor 10 in accordance with the invention. In other embodiments, an integrated anchor 70 may actually include all bracketing and anchoring in a single piece, even a monolithic piece 70 of a simple homogeneous material.

By any mode, a method 80 for using anchors 10 in accordance with the invention may include manufacturing and providing 82, followed by a process 84 of installation.

Selecting 85 may involve selecting parameters that will govern the performance of an anchor 10 in accordance with the invention. For example, in certain embodiments, the specific material properties may be significant. Thus, selecting values corresponding to material properties may be important.

In some embodiments, determining whether a material property requires a metal, a polymer, a composite, or the like may hinge on the specific performance characteristics in terms of strength, spring constant, yield values of stress, deflection, maximum working strength, stiffness, and so forth.

Based on the parameters that are selected 85, selecting 86 the material properties may be done by specifying what values the parameters must meet. Thus, operational parameters may result in the characteristic properties, such as mass, density, maximum tensile stress, maximum strain, weight, dielectric or conduction properties, and so forth. Likewise, structural strength, coefficients of thermal expansion with temperature, resistance to corrosion, and so forth may be selected 86 as material properties that will govern construction of an anchor 10.

Selecting 87 securement systems may involve securements at opposite extremes ends of each anchor 10. For example, a securement mechanism to secure a base 12 to a wall 52 of a building may be one securement, while the securement by way of a fastener 34, keeper 32, or integrated arms 62 and guides 64 may also be considered securements. Accordingly, selecting 87 the types and numbers, as well as the operating mechanisms for various securements may determine what form of anchor 10, and what mechanical configuration may be required.

Ultimately, selecting 88 materials for each of the components included in an anchor 10, may result directly or indirectly the previous selections 85, 86, and 87. Moreover, selecting 85, 86, 87, 88 may also include, and in an overall context will include, selecting the materials that will be used in the overall lightning protection system.

For example, cables may be fabricated of copper, aluminum, or other materials. Typically, the duty cycle, weight, electrical conductivity, thermal conductivity, and so forth do not require gold. Circuits exist that are fabricated using gold as the conducting material. Nevertheless, typically, aluminum tends to be lighter than copper, whereas copper tends to be a better conductor based on area, mass, and various other parameters. By the same token, aluminum is considered more economical. Thus, selecting 88 a material for a cable 56, anchors 10, brackets 34, integrated anchors 70, points 40, and so forth may significant considerations of material properties, fabrication methods, and so forth.

Cutting 89 stock into the materials and components to be used applies to both the components of the installation, as well as the anchors 10 and their associated or corresponding parts. For example, cutting the pad 14, that has been selected 88, at the dimensions specified will constitute one element. By the same token, cutting 89 anchors 10, or base plates 12, or studs 16, or otherwise fabricating them may be another consideration. Similarly, folding of metal sheets after cutting 89 to size, and possibly cutting 89 with separation lines for appropriate folding may also be included. Likewise, methods of making and using brackets 34 to support cables 56, points 40, or the like may be considered.

In one embodiment, cutting 89 integrated anchors 70 may involve stamping a blank 130 (See FIGS. 42 and 46), and cutting certain separation lines in that blank 130 to be followed by other manufacturing processes.

Another manufacturing process 90 or step 90 may include assembly, fabrication, or both for an anchor. For example, in certain embodiments, the stud 16 may be formed as part and parcel of an anchor 10, as a monolithic, homogeneous, integral portion of the anchor. Thus, like a nail, bolt, or the like, the anchor 10 may be formed with a base 12 and stud 16 of a single material, formed, stamped, forged, or otherwise manufactured in a single step, or single process, as a suitable manufacturing method.

By the same token, bases 12 and studs 16 may be cut from flat stock and round stock and welded, pressed, threaded, or otherwise fabricated to bond together. Likewise, the entire anchor 10 may be fabricated of a polymer material in a molding process or by other suitable approach.

Other components to be assembled 90, fabricated 90, or otherwise manufactured 90 may include a nut 32 or other type of keeper 32, a fastener 34, adapted to securely holding a point 40 or cable 56, or the like.

In one fabrication 90, contemplated within the scope of the present invention, a flat material bender may fold past a yield point the middle of a blank 130 for an integrated anchor 70. Various bends may be required in order to form all the distinct arms 62, guides 64, retainers 66, detents 67, vertices 69, and so forth with the appropriate gaps 63, angles, clearances, or the like. Likewise, other manufacturing processes, such as quality control, buffing, blasting, painting, heat treating, and so forth may be important to the material properties selected 86. Some process steps may also be done with blanks, finished parts 10, or the like.

Packaging 92 the individual anchors 10 or components for the anchor system may be adapted to the ultimate use thereof. For example, in assembling 90 an anchor 10, the pad 14 may be manufactured, provided, cut 89, and assembled 90 to go into a packaging step 92 as a system ready to be installed with virtually no tools. In other embodiments, the pads 14 may each be provided as a separate article or a supply to be secured to a base 12 of an anchor 10 at the time of installation.

Accordingly, providing 91 procedures to installers may include printed instructions, downloadable files, website instructions, or the like. In fact, written procedures that will be packaged 92 with the anchors 10 may be included, while online instructions may also be provided 91 as a back up.

Finally, distributing 93 the anchors 10 through secondary distribution channels, direct to users, to installers, or the like may be done in a suitable manner. Typically, packaging 92 may include warnings, which may also be part of providing 91 procedures.

A process 84 or method 84 for installing an anchor 10 in accordance with the invention may begin with accumulating or otherwise gathering specifications for the performance of a lighting-protection system. Based on distances, sizes, topography, geology, urbanization, and so forth, one may analyze 94 the specifications for a particular project. This may lead to the consequent points 40 to be supported and cables 56 to be carried by the anchors 10.

Selecting 95 sizes, materials, and processes for assembling and installing the anchors 10 and their associated points 40 and cables 56 will appropriately follow. Sizes in certain embodiments are standardized and established by building codes. Building protection codes for arresting lightning exist in many jurisdictions, and may be determinative of selecting 95 the sizes, materials, and processes for installation. In other jurisdictions, cost, contemplated conditions, and the like may also factor into the selection 95 of materials, their sizes, and their processes for installation.

An installer may then apply the systems 96 by obtaining from distribution 93 the quantities of anchors 10, keepers 32, points 40, cables 56, other fasteners, and install them. Typically, anchors 10 will be installed near the highest extrema of a building, thereby protecting the building, it's metallic components, its structure, and so forth from the high voltages, currents, heating, and the like associated with lightning strikes.

In general, lightning protection systems will be grounded to earth. Points 40 will extend at their distal ends to increase the voltage stress or provide a stress concentration point at the distal end of a point 40. Thereby, dielectric breakdown in the surrounding air will occur first at a point 40, and particularly at the distal end of the point 40. Thus, following the initial corona effect that is typical of electrically active atmospheres, the electrical breakdown by lightning will occur at the distal end of a point 40, sending electrical current through the point 40, its anchor 10, and to the associated cables 56 carrying current to a grounding cable 56 that eventually is anchored in the earth.

Referring to FIG. 29, in one embodiment of a method in accordance with the invention, an application process 100 may involve sizing 101 anchors 10 for use in an installation. Therefore, selecting 102 a material for the pad 14 may be conducted. Sizing 103 the pads 14 may include consideration of surrounding materials, clearances, thicknesses, areas, sealing, offsets, or the like. Thickness may be governed by structural (stress, strain) requirements, installation to tolerances, and relative coefficients of thermal expansion of surfaces 35, bases 12, and pads 14. In certain embodiments, sizing 103 the pads may be dictated by the sizing of the base plate 12 to which each pad 14 will connect.

Cutting 104 the pads and applying 105 the pads 14 to a base plate 12 may be done at the time of installation, or may be done in a manufacturing process 100 at a factory shipping completed anchors 10. Likewise, applying 105 the pad may involve cutting 104 a pad to size. Nevertheless, in some embodiments, applying 105 the pads 14 to the base plates 12 may occur in a factory.

Installation may then include selecting 106 a location 60 on a building. Typically, the location 60 will be near the top of the building, and therefore on a flashing 54 or cap 54 covering a parapet 52 or a wall 52. Cleaning 107 the location 60 may involve mechanical abrasion, chemical cleaning, or simply a solvent wash. Typically, slight scrubbing with a solvent will clean off residues. In some embodiments, cleaning 107 may involve removing oxidized material having poor adhesion to the surface 35 of the base material at the location 60.

Exposing 108 the pad 14 may involve removing a polymeric film that has low adhesion forces with respect to the adhesive pad 14. Thus, exposing 108 the pad 14 by removing a film, for example, permits a user or installer to apply 109 the anchor 10 by pressing the anchor 10, and the underlying pad 14 against the location 60 on the surface 35. In this manner, the adhesive properties of the pad 14 may bond to the surface 35 as an adhesive process.

In certain embodiments, it has been found that a pressure sensitive adhesive operates well. Structural adhesives exist, and pressure sensitive adhesives exist. Accordingly, in one embodiment, the pad 14 is provided with, or as part of a pressure sensitive adhesive system having an expanded polymeric material (polymer foam) having adhesive front face 22 and rear face 24. Upon application of pressure, the adhesive may adhere, or actually cure.

That is, for example, certain acrylates require a lack of oxygen to cure. Other materials, such as epoxies and other materials may cure by heat, light, reagents, other chemicals, or the like. Accordingly, the adhesive may be applied as multi-part, single-part, heat-curable, pressure-sensitive, or otherwise. Applying 109 an anchor 10 may provide sufficient strength in the bond between the pad 14 and the surface 35 to immediately mount the remainder of the lightning-protection system.

In certain embodiments, it may be required to apply 110 a cure condition. For example, time, heat, light, chemicals, or the like may be required to cure the adhesive of the pad 14. Accordingly, applying 110 the condition required to effect a cure may require time, an additional step 110, or the like. In certain embodiments, applying 110 to cure condition may be simply a matter of waiting for passage of time with or without pressure.

Positioning 111 a cable 56 in the anchor 10, or in a position to be supported by the anchor may be followed by binding 112 the cable to the anchors 10 as discussed hereinabove. Typically, binding 112 the cable 56 may involve tensioning the cables by binding 112 and end of a segment of cable 56 at one clamp, and pulling a tensile load in the cable 56, in order to reduce sag, before binding 112 the cable 56 at the next or certain intermediate anchors 10.

Referring to FIGS. 30 and 31, while continuing to refer generally to FIGS. 1 through 48, a system 10 in accordance with the invention may include a head 120 manufactured by any suitable method, such as casting, forging, rolling, stamping, machining, or the like. Thus, the head 120 may be a forging, casting, fabrication, or the like.

In certain embodiments, it is possible that the head 120 may be stamped, but such a configuration is less desirable. One reason that a casting or forging process may be preferred is that current density should be low and thermal mass high. Plenty of solid, conducting metal cross section is desired. A suitable dimension for the diameter of the head 120 is from about 2 to about 3 inches. Typically, 2¼ inches would provide a good target diameter for the head 120. Similarly, the thickness may be from about ½ to about 1 inch. A target thickness of about 0.63 inches is contemplated for one present design concept.

The head 120 is shaped something like a puck 120 in order to provide significant mass and stiffness. The mass is effective to absorb energy or heat without the head 120 overheating, melting, or otherwise suffering catastrophic damage during a lightning strike. Likewise, the thickness provides stiffness or an improved "section modulus" as that term is understood in the engineering art. A higher section modulus provides for greater stiffness of the component 120, and thus better clamping force without damage or distortion.

The head 120 may be provided with various apertures 122, 124, as well as excavations 126 or relief 126 or relief channels 126 forming slots 126 on the underside 128b opposite the top face 128a. The aperture 122a operates as a receiver 122a to receive a vertically oriented point 40 therein by threaded engagement, with the head 120 in a horizontal orientation. In contrast, the receiver 122b extends through the circumference of the head 120 in order to orient a point 40 vertically when the head 120 is mounted to a base plate 12 on a pad 14 against a vertical surface of a building or other protected structure.

Herein, a trailing letter following a reference numeral refers to a specific instance of the item identified by the reference numeral. Therefore, it is appropriate to refer to a receiver 122 to include any particular one or all receivers 122, and the receivers 122a, 122b as those receivers that are specified for specific examples of structure or function.

A point 40 may be threaded into the appropriate receiver 122a, 122b. This should follow after the head 120 has been properly mounted to a surface of a protected structure.

Mounting the head 120 is accomplished by use of the apertures 124 which serve as securement apertures 124. Meanwhile, the relief channels 126 or slots 126 are formed in the back face 128b or back surface 128b of the head 120. The relief channels 126 are formed as partially excavated, machined, molded, or forged channels 126. These channels 126 or relief channels 126 may be shaped rectangularly, as semi circles, or as some other curved shape. The cross section of a curved shape may be fitted to the outer circumference of a connecting cable 56 (conductor 56) connecting the head 120 and its associated point 40 to the overall lightning protection system.

By crossing each of the channels 126 or reliefs 126 at right angles to one another, the head 120 can be accessed by a cable 56 from either a horizontal traverse (run) or from a vertical climb (run). Thus, regardless of whether a cable 56 is coming from another anchor system 10 spaced horizontally away or spaced vertically away from the head 120, the cruciform orientation of the channels 126 will accommodate capture of a cable 56 therein.

In order to provide a capture of a cable 56 by the universal mount head 120, a cleat plate 130 or mandible 130 sits under the cable 56 opposite the back face 128b of the head 120.

The cleat plate 130 or mandible 130 is provided with racks 132 corresponding to each side. Each rack 132 is cut to form teeth 134 at the extreme edge thereof. The racks 134 may be formed by cutting, stamping, or otherwise separating the rack portion 132 from the bulk of the mandible 130. Thus, the rack 132 may be cut along with the shape of the teeth 134 in a single operation.

Eventually, during cutting, or thereafter, the racks 132 may be bent to extend away from the remainder of the cleat plate 130 or mandible 130 at an angle of from about 30 to about 60 degrees. A target angle of about 45 degrees has been found suitable. The teeth 134, and their racks 132, meanwhile may be formed to be from about ½ to about 1 inch wide, with a target distance of about 0.63 inches and a clearance of an additional 2 to 3 thousandths of clearance between the rack 132 and the surrounding material of the mandible 130.

The racks 132 may be centered along each side of the mandible 130. The overall length of each rack 132, including the teeth 134 may be from about ⅓ to about ½ inch, with a target distance of about 0.4 inches, with an additional clearance of a few thousandths. The illustrated embodiment has about 3 thousandths clearance between the teeth 134 and the surrounding material of the mandible 130.

In the illustrated embodiment, the apertures 136 in the mandible 130 are formed near each of the four corners, which may be rounded appropriately for manufacturing and safety purposes. The apertures 136 in one embodiment are equidistant from one another along each side such that the mandible 130 may be fit within a square that is thereby planar symmetric with respect to a diagonal or median therethrough. Thus, each center line provides a line of symmetry, each diagonal provides a line of symmetry, and a point on an axis perpendicular to the plane of the mandible 130 is a point of symmetry in that plane.

Thus, the apertures 136 may be sized and fitted to secure with nuts 32 on the studs 16 of a base plate 12. A square base plate 12 mounted to a suitable pad 14 may mount to a building or other protected structure as described hereinabove. By having point symmetry in the base plate 12, and its studs 16, the mandible 130 or cleat plate 130 may be mounted in any of four different orientations. Symmetry renders each pair of such orientations symmetric or identical.

However, the orientation of the studs 16 may be vertical or horizontal. Meanwhile, the mandible 130 also has studs 140 that may be welded, forged, threaded, swaged, pressed, or otherwise secured to the mandible 130. The studs 140 in one embodiment are called PIM studs. These studs 140 have a stepped head 142 that has a spline 144 or a splined portion 144 in addition to the threads 146. The head 142 is formed to be sufficiently large that it will not fit through an aperture 124. The spline 144 makes an interference fit to be swaged into securement within the mandible 130, thus becoming part of the mandible 130. The threads 146 pass through the apertures 139.

The large contact surface area of the studs 140 against the main expanse of the mandible 130 assures that good electrical contact is made. Nevertheless, as opposed to prior art systems and brackets, the head 120 renders the studs 140 of less consequence. For example, in prior art systems, attachment hardware has often been responsible for carrying electrical current. Small cross sectional areas, small thermal mass, weak mechanical structures, and the like have contributed to such hardware being literally taken out of the circuit by evaporation, melting, distortion, or the like. In contrast, the contact area between the relief channels 126 and the cable 56, is relied upon and is extensive.

The pressure is substantial that may be brought to bear by securing the nuts 138 onto the studs 140 to capture the head 120 against the mandible 130. Specifically, the teeth 134 of the mandible 130 provide a secured connection and a substantial load (force, pressure). The relief channels provide a large contact surface area. Thus, the connection between the studs 140 and the remainder of the mandible 130 need not actually carry any electrical current. Nevertheless, the teeth 134 still provide good contact, and another path of electrical connection, as well as a mechanical stabilization of the cable 56 within the relief channels 126.

The head 120 saddles the cable 56 or conductor 56, and the relief 126 is less than a semicircle. Thus, the head 120 may be tilted (rotated) about the conductor 56 at installation. In one embodiment, sufficient tolerance may be provided between the apertures 124 and studs 140 to permit adjustment (e.g., tilting, leveling) of the head 120, to true the point 40 to a plumb line (vertical).

For example, in the configuration of FIG. 30, to level the head 120, the nut 138 on a stud 140 on one side of the head 120 may be threaded down farther than the nut 138 opposite. By thus rocking or tilting the head 120, about the conductor, toward that side, the head may be leveled. The point may be moved with the head into a trued vertical (plumb) orientation.

In another configuration, seen in FIG. 31, the head 120 may be similarly tilted about the conductor 56 mounted on a vertical, protected surface. The point 40 may be tilted as necessary to render it plumb.

In a typical embodiment, it will be unnecessary to pivot the head 120 about the center of its diameter (e.g., rotate the disk about its center of symmetry). This is because the base 12 may be and should be oriented (rendered plumb) at the time of installation against the attachment surface of the protected structure.

However, in one embodiment, tolerances in the studs 16 and nuts 32, as well as in the studs 140 and nuts 138, may be constructed to permit slight rotation of the head 120 (with respect to a vertical mounting surface) about the center of its diameter. For example, in FIG. 31, the apertures 136 may be round, somewhat oval, or slots permitting more movement. However, as stated hereinabove, there is a benefit to comparatively closer tolerances precluding any "requirement" of adjustment by rotation about that center point. Note that there may be two or four studs 16, although only two are shown, for clarity, in FIGS. 30 and 31.

Referring to FIGS. 30 through 32, a method for installation may sequence certain assembly processes. For example, in certain embodiments, a pad 24 may be applied to a building or other protected structure prior to application of a base plate 12. However, the base plate 12 may be manufactured with the pad 14 secured thereto with the back face 20 of the base plate 12 secured to the front face 22 of the pad 14. In this configuration, the back face 24 of the pad 14 may be covered with a suitable protective layer to be removed at the time of installation. One benefit to having the pad 14 and base plate 12 preassembled is to remove any need for alignment therebetween in the field.

Also, the studs 16 provide a mechanism for handling and manipulating the base plate 12. They make sure it may be oriented as desired. Typically, this will mean that the base plate 12 will have one edge of one side that is exactly horizontal. In a vertical orientation for the surface of a protected structure, the top edge of a base plate 12 will be horizontal, as well as the bottom edge. The base plate 12 will be orientated as a vertical plane secured to the protected structure.

In a horizontal orientation for the surface of a structure (and the hub 120 or head 120), the base plate 12 is oriented as a horizontal plane. The orientation within that plane is not particularly consequential other than orienting to receive the cable 56. Thus, the head 120 may be secured to the base plate 12 together with the mandible 130 or cleat plate 130.

In one embodiment, the base plate 12 and pad 14 arrive from the factory preassembled for positioning on a vertical or a horizontal surface. On site, the base plate 12 is simply secured to the protected structure at the proper location and the vertical or horizontal orientation desired.

Thereafter, the mandible 130 may be oriented according to the position of the head 120 in the ultimate point 40 configuration. For example, in the illustrated embodiment, the receivers 122a, 122b are drilled apertures 122a, 122b threaded to receive a point 40 therein. However, in any particular installation, one head 120 need receive a single point 40. That point 40 will be threadedly secured into either the receiver 122a (when the head 120 is on a horizontal protected surface) or the receiver 122b (when the head 120 is secured to a vertical protected surface).

Although the apertures 124 are point symmetric and planar symmetric within the head 120, there is not sufficient room in the illustrated embodiment to provide multiple receivers 124b around the circumference of the head 120. Thus, for example, one will note that one half of the head 120 contains the receiver 122a, and the other side or half of the head 120 contains the other receiver 122b.

Thus, although the apertures 124 may be registered on the studs 140 of the mandible 130 in either of two directions, 180 degrees apart, only one will result in the point 40 extending vertically. Thus, the mandible 130 or cleat plate 130 on a vertical protected surface needs to have the orientation or relative positions of the studs 140 arranged to position the point 40 vertically.

It is conceivable that points 40 may be oriented horizontally in some configuration. However, this is typically an exception. The points 40 are typically mounted on the highest location in a protected structure. That highest extremum must be accessible. The comparatively smaller diameter to longer length (aspect ratio) of each of the points 40 (compared to the protected structure) is important. A point 40 tends to produce the electrostatic stress that will induce earliest electrical breakdown of the atmosphere associated with a lightning strike.

Referring to FIGS. 33 through 40, while continuing to refer generally to FIGS. 1 through 48, the head 120 is designed to have a thickness and diameter that provide the relief channels 126 sufficient contact surface area with a cable 56 (conductor 56) secured thereby. Meanwhile, the teeth 134 of the racks 132 urge the cable 56 into contact with the relief channels 126. Racks 132 may be deflected, deformed, or otherwise moved elastically, plastically, or both by the force of the head 120 thereagainst when cinched down by the head 120 in response to the nuts 138 on the studs 140.

One will note that the receiver 122a may conveniently be formed as a through-hole 122a through the entire thickness of the head 120. In contrast, there is little or no benefit to making the receiver 122*b* as a through-hole configuration. In some embodiments, relief may be required in the receiver 122*b* in order to accommodate threading therein to by the point 40.

The holes 124 or apertures 124 may be sized to fit snugly, or to provide sufficient clearance for easy assembly. In one embodiment, the apertures 124 are nominally at about ⅜ of an inch, but may range from about ¼ to about ⅜ of an inch. At around ½ inch, interference with the cable 56 may be a problem since the cable 56 must traverse across opposite racks 132 of teeth 134 between the studs 140.

The studs 140 are positioned such that the cable 56 may cross the mandible 130 across either opposing pair of racks 132 and associated teeth 134. Thus, the mandible 130 with its orientation is not dependent on the orientation of the cable 56. It can accommodate either vertical or horizontal cables 56. However, the position of the studs 140 does control the orientation up or down by the point 40 if threaded into the edge receiver 122*b* (compared with the face receiver 122*a*).

Referring to FIGS. 35 through 40, one may see that the apertures 124 are juxtaposed to one another on opposite sides of the cable 56. The cable 56 may pass therethrough in either orthogonal (horizontal or vertical, or lateral or transverse) direction. Likewise, each of the receivers 122*a*, 122*b* is drilled at a location such that it will not interfere with either of the apertures 124. Thus, each quadrant of the head 120 defined by the cruciform of the relief channels 126 is occupied by either a receiver 122*a*, 122*b* or an aperture 124 for receiving a stud 140.

Typically, the relief channels 126 are conformal to the diameter of a cable 56. However, a nominal ½ inch diameter may be from about ⅜ to about ¾ of an inch. Typically a target diameter is about 0.56 inches. Nevertheless, the incursion of the relief channel 126 is not the full diameter thereof. Rather, a distance of from about ¹⁄₁₀ to about ¼ inch with a target distance of about 0.13 inches has been found suitable for incursion of the arc of the relief channels 126 into the head 120.

Referring to FIGS. 41 through 48, a cleat plate 130 or mandible 130 may be formed from a blank 130 stamping. The completed mandible 130 or cleat plate 130 with associated racks 132 of teeth 134 and studs 140 in place for installation is illustrated in FIGS. 41 through 45. The blank 130 is illustrated in FIGS. 46 through 48.

At installation, the racks 132 extend at an angle of about 45 degrees from the main portion of the cleat plate 130 or mandible 130 in the illustrated embodiment. The studs 140 may extend a distance suitable for receiving a nut 138 and the head 120 with ample length to spare. Thus, the studs 140 may extend from about ¾ to about 1¼ inches. The apertures 136 of the mandible 130 are difficult to impossible to access under the head 120. At the least, the access to the nuts 32 securing the mandible 130 to the base plate 112 are most easily secured before attachment of the head 120 to the studs 140 by the nuts 138.

Referring to FIGS. 41 through 45, the bending of the racks 132 provides a certain amount of clearance gap between the racks 132 and the adjacent base material of the cleat plate 130 or mandible 130. However, in the original blank 130, a minimal clearance exists between the racks 132 and the base material of the mandible 130 or cleat plate 130.

Referring to FIG. 44, the studs 140 are shown as installed, a cut away view illustrating the underlying shape of the head 120 with a spline 144 for securement by swaging into the mandible 130 or cleat plate 130.

Referring to FIGS. 46 through 48, one will note that the blank 130 configuration has no studs 140 installed, and the racks 132 are coplanar with the remainder of the mandible 130. In some embodiments, the blank 130 may be cut as a flat member as illustrated. However, in certain embodiments of a process for manufacturing the mandible 130, the stamping of the mandible 40 may include cutting and bending of the racks 132 to their final orientation. However, insertion of the studs 140 will necessarily require a previous drilling operation or stamping operation to create the apertures 139 for receiving the studs 140.

Referring to FIGS. 47 and 48, one may see that the blank 130 of a cleat plate 130 or mandible plate 130 is basically a single rectangle of standard sheet stock. Only the racks 132 with their teeth 134 along with the studs 140 extend above that planar surface.

Referring to FIG. 48, in certain embodiments, the racks 132 may be formed (yielded) into their alternate positions prior to installation of the studs 140. In certain embodiments, the stamping of the shapes of the racks 132 and teeth 134 may be done in a single stamping operation. In fact, the apertures 136, 139 may actually be formed in the same stamping operation as the formation of the racks 132 and teeth 134.

Punching, cutting, and bending may all be done in a single operation. In other embodiments of a process for manufacturing, the apertures 136, 139 may be drilled, and the bending of the racks 132 into position may occur as a separate operation. This is a matter of manufacturing economy as to which sequence of events would be followed. Thus, the blank 130 may be ready to receive both the bending of the racks 132 and the insertion or swaging of the studs 140 into position.

Alternatively, the embodiment of FIG. 48 may be an intermediate configuration of a blank mandible 130. It may result following stamping or drilling of any cuts or apertures needed. It may also follow bending of the racks 132, but come before swaging of the studs 140 into position.

A threaded receiver 122*a* provided in the head 120 or hub 120 for mounting an "air terminal" point 40 should typically have at least five full threads. If internally threaded the minimal wall thickness should be not less than ¹⁄₁₆ inch (1.6 millimeters) at the base of the threads. Each base plate 12, and cleat plate 130 or mandible 130 should have connector fittings suitable for supporting the forces imposed by the weight of the lightning conductor 56 or cable 56, as well as the system 10.

The conducting cross sectional area between the cable 56 and the relief channels 126 of the head 120 or hub 120 should be equal to or greater than the cross-sectional area of the conductor 56 (cable 56). The contact between the cable 56 or conductor 56 and the relief channels 126 in the underside of the head 120 should be not less than 1½ inches (38 millimeters) on opposite sides of the cable 56 and comply with IEEE standard 837 for commercially available lightning protection conductors.

The mounting apertures 136, as well as the apertures 139 for the studs 140 should accept a number 10-24 or larger bolt or screw required to permanently and rigidly secure the head 120 or hub 120 to the mandible 130 or cleat plate 130. In certain embodiments, the adhesive base pad 14 will include a minimum footprint of about 7 square inches (45.16 square centimeters) overall. Meanwhile, the cleat plate 130 or mandible 130 includes six openings of about ¼ inch (6.35 millimeters) or greater and an overall minimal width of about 2 inches (50.8 millimeters).

The typical materials may be aluminum of thickness of three thirty seconds of an inch (2.4 millimeters) minimum in a casting or 0.97 inches (2.46 millimeters) in a stamping. Likewise, a copper or copper alloy mandible 130 may include a minimum thickness of three thirty seconds (2.4 millimeters) if cast, and 0.061 inches (1.55 millimeters) if stamped.

Materials may be brass, copper, aluminum, alloyed, or the like, but should be electrical grade. They should meet the minimal electrical conductivity standards for Underwriters Laboratories Standard 96, the standard for lightning protection component sections. Chamfers and radii break all sharp corners. Any shape that is not circular may still have an effective diameter defined as four times its area (cross section) divided by its perimeter (also known as hydraulic diameter).

Referring to FIGS. 49 through 56, while continuing to refer generally to FIGS. 1 through 56, in an alternative embodiment of a base 120, the base 120 may be forged to be stronger, and yet require less material. In fact, the thickness of the base 120 may be selected to optimize the cross sectional area for the flow of electricity (current density) between any air terminal 40 or point 40 inserted into the base 120.

For example, as discussed hereinabove, the receivers 122a, 122b are formed to receive a point 40 or air terminal 40. Typically, only one of the apertures 122a, 122b or receivers 122a, 122b will actually receive a point 40. If the base 120 is mounted to a vertical wall, near an edge thereof, than a point 40 may be inserted into the aperture 122b by threading thereinto. This will make the point 40 extend parallel effectively to the base 120.

Orientation of the base 120 may permit such a point 40 to be oriented vertically or horizontally away from the building to which the base 120 is secured. This is true regardless of whether the base is on a horizontal or vertical surface.

In one alternative arrangement, the base 120 may be placed on a horizontal surface, and a point 40 may be inserted into the aperture 122a to extend vertically, or into the aperture 122b to extend horizontally or vertically. Thus, substantially any orientation of a point 40 may be accommodated by a combination of rotating or otherwise orientating the base 120, and selecting which of the receivers 122a, 122b into which a point 40 will be threaded.

Moreover by forging, the thickness of the head 120 may be reduced. Thus, the length or distance through the apertures 124 may be reduced. This reduces the bearing length of fasteners 140 passing through those apertures 124. Therefore, another two degrees of freedom permit adjusting the pivoting head 120 across the cable 56 to trim the orientation of the point 40.

The securement apertures 124 may be arranged to receive studs 140 as described hereinabove. In the illustrated embodiments, the thickness of the head 120 in a forging may be considerably less than the puck-like shape of other alternative embodiments. For example, in this illustrated alternative embodiment, the relief channels 126 may still exist, although the thickness of the head 120 or surrounding them is considerably reduced. Similarly, the same cleat plate 130 or mandible 130 may be used to secure the head 120 by studs 140 and keepers 138 or nuts 138 securing the head 120 to the cleat plate 130 or mandible 130. Thus, the loading to maintain contact pressure between a cable 56 passing between the teeth 134 of the mandible 130 and the relief channels 126 of the head 120 will operate in similar fashion to embodiments previously disclosed hereinabove.

However, one significant difference is that the effective length of each of the apertures 124 in the illustrated embodiment are considerably shorter. Thus, providing a clearance or tolerance in the diameter of each of the apertures 124 provides a larger gap between the studs 140 and the walls of the apertures 124. The effect is to provide a greater degree of tilt or misalignment possible in order to orient the apertures 122a, 122b, and ultimately the air terminals 40 or points 40 to be threaded thereinto.

For example, a worker tasked with installing a base 120 may secure the nuts 138 to the studs 120 in order to capture the head 120 therebetween. However, given the tolerances between the outer diameter of each stud 140 and the inner dimeter of its associated aperture 124 provides a certain amount of "play" or tilt angle to which the base 120 may be subjected. Accordingly, one may tighten a nut 138 to a greater or lesser extent in order to shift the orientation of the apertures 122a, 122b.

An installer may thread a point 40 into one of the apertures 122a, 122b. The installer may then orient the point 40 in a desired direction, and tighten the nuts 138 onto the studs 140 in an order and to a distance designed to maintain the selected orientation of the point 40.

In order to provide sufficient "bearing length" within the apertures 122a, 122b, the thickness of the base 120 generally may be insufficient. Accordingly, a tower 150 and a lug 152 or tunnel 152 may be forged as part of the base 120. These may later be drilled and tapped (threaded) to match the threads on a point 40 or an air terminal 40. Thus, the bearing length or the overall length of the threaded engagement of the tower 150 and tunnel 152 receiving air terminals 40 or points 40 may be extended to any suitable length found mechanically desirable based on engineering structural calculations.

Likewise, the apertures 124 receiving the studs 140 may also benefit from an increased cross sectional area for carrying electricity, for stiffening the base 120, or for establishing a bearing length of the apertures 124 with respect to the studs 140.

To that end, a boss 154 may be formed in the base 120 as an integral, homogenous portion thereof, forged as part of the base 120 as a single piece (monolith). In one currently contemplated embodiment, the entire base 120, including the relief channels 126, the tower 150, the tunnel 152 or lug 152, and the boss 154 may be forged in a single, homogeneous piece. In fact, the apertures 122a, 122b as well as the apertures 124 may all be so formed.

However, typically, the tapping of the apertures 122a, 122b will be done by machine tools. Similarly, the apertures 124 may also be sized, and more precisely located, by boring or otherwise machining to a standard diameter at a standard distance apart.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus operable to ground a lightning strike, the apparatus comprising:

a base capable of being anchored to a structure by securement without penetration of the structure directly to a surface oriented as one of nominally horizontal and nominally vertical;

a head, having an inner face and an outer face, the inner face positionable proximate the base and the outer face formed to receive therein a point capable of attracting the lightning strike;

the head, holding a conductor in contact against the base, the head being tiltable about the circumference of the conductor; and a fastener capable of extending between the base and head to "trim" the head to position the point in a vertically plumb orientation and fix the head thereafter.

2. The apparatus of claim 1, wherein the head is formed in a single, integral piece.

3. The apparatus of claim 2, wherein the piece is formed of a homogeneous material.

4. The apparatus of claim 2, wherein the head is forged of a metal.

5. The apparatus of claim 1 wherein the head comprises apertures shaped to receive and secure the point, in one of at least two orientations, orthogonal to each other.

6. The apparatus of claim 5, wherein at least one of the apertures is positionable to orient the point in a nominally vertical direction, regardless of whether the base is secured to a horizontal or a vertical surface.

7. The apparatus of claim 6, wherein the head engages the fasteners to true the head from the nominally vertical direction to a plumb vertical position.

8. The apparatus of claim 1, wherein:

the head is provided with two relief channels, each having a cross section characterized as a portion of a circle;

the apparatus comprises the point and the conductor, each conformal to a corresponding cylindrical shape and a mandible, between the base and the head, deformable in urging a cable against the head, without yielding of any one of the head, the base, and the fasteners; and the base is outside a direct, conductive path of the lightning strike passing through the point and head to the conductor.

9. An apparatus for drawing a lightning strike, the apparatus comprising:

a base, securable directly to a securement surface of a structure, the securement surface selected from a horizontal surface and a vertical surface;

a head, having an inner surface positionable opposite the base and an outer surface capable of receiving a point of a size and shape selected to draw the lightning strike;

the head, wherein the inner surface provides a relief channel having a cross section sized to partially surround a conductor captured between the base and head; and the head and base capable of being cooperatively spaced apart by the conductor, rendering the head capable of orienting the point vertically plumb by a combination of fixing the point into one of a plurality of apertures in the outer surface, in a nominally vertical orientation, regardless of whether the base is secured to the horizontal surface or the vertical surface.

10. The apparatus of claim 9, comprising a selectively securable fastening mechanism capable of connecting the base and head, opposite one another across the conductor, in a first, adjustable, position rendering the head pivotable about the conductor, and a second, fixed, position rendering the base, conductor, head, and point fixed with respect to one another.

11. A method comprising:

providing an apparatus comprising a base, a head, a conductor, and a point;

securing the base directly to a securement surface of a structure without penetration of the structure;

capturing the conductor between the base and the head;

positioning the point in an initial orientation in the head; and trimming the point to a vertically plumb position by tilting the head around the conductor.

12. The method of claim 11, wherein:

the base is provided with a relief channel formed in an inner surface of the head around the conductor; and tilting comprises rotating the relief channel about a circumference of the conductor.

13. The method of claim 11, comprising fixing the base, conductor, and head with respect to one another by urging the head toward the base.

14. The method of claim 13, wherein the head is provided with a relief channel sized to partially surround and contact the conductor;

capturing the conductor comprises engaging a fastener extending from the base through the head; and the method comprises fixing the head, conductor, and base with respect to one another by tightening the fastener.

15. The method of claim 14, comprising:

capturing the conductor by at least two fasteners; and tilting the point by tightening the two fasteners to position the head at differing distances from the base.

16. The method of claim 11, wherein an electrical cross-sectional area available to conduct the lightning strike through each of the point and base is greater than a conductor cross-sectional area of the conductor.

17. The method of claim 11, wherein a contact area available between the conductor and head, through the relief channel, exceeds a cross-sectional area of the conductor.

18. The method of claim 11, wherein the head and base are capable of being cooperatively spaced apart by the conductor, rendering the head capable of orienting the point vertically plumb by a combination of fixing the point into one of a plurality of apertures in the outer surface, in a nominally vertical orientation, regardless of whether the base is secured to the horizontal surface or the vertical surface, and tilting the head about the conductor prior to fixing rigidly the head with respect to the base.

19. The method of claim 11, comprising establishing the point, secured to the head, at an initial orientation, the base being fixed to the structure protected, and thereafter trimming the point to vertically plumb, without yielding the head nor the point.

20. The method of claim 11, comprising:

providing the head with apertures mutually orthogonal to one another and each capable of selectively securing thereto the point;

determining the base orientation of the base, depending upon a surface orientation of the securement surface and the point orientation desired;

orienting the point vertically as the initial orientation;

connecting the base to the head absent rigid securement therebetween; and trimming the point to vertically plumb by sliding a relief channel in the head circumferentially around the conductor before permanently fixing the head with respect to the base.

* * * * *